(12) United States Patent
Chang

(10) Patent No.: US 10,936,858 B1
(45) Date of Patent: Mar. 2, 2021

(54) GENERATING A MOOD LOG BASED ON USER IMAGES

(71) Applicant: Snap Inc., Santa Monica, CA (US)

(72) Inventor: Sheldon Chang, Venice, CA (US)

(73) Assignee: Snap Inc., Santa Monica, CA (US)

( * ) Notice: Subject to any disclaimer, the term of this patent is extended or adjusted under 35 U.S.C. 154(b) by 139 days.

(21) Appl. No.: 16/167,175

(22) Filed: Oct. 22, 2018

Related U.S. Application Data

(63) Continuation of application No. 14/691,249, filed on Apr. 20, 2015, now Pat. No. 10,133,918.

(51) Int. Cl.
    *G06K 9/00* (2006.01)

(52) U.S. Cl.
    CPC ..... *G06K 9/00308* (2013.01); *G06K 9/00281* (2013.01); *G06K 9/00315* (2013.01); *G06K 9/00362* (2013.01)

(58) Field of Classification Search
    CPC ........... G06K 9/00308; G06K 9/00315; G06K 9/00281; G06K 9/00362; G06F 2203/011
See application file for complete search history.

(56) References Cited

U.S. PATENT DOCUMENTS

| | | | |
|---|---|---|---|
| 6,038,295 A | 3/2000 | Mattes | |
| 6,622,140 B1 | 9/2003 | Kantrowitz | |
| 6,980,909 B2 | 12/2005 | Root et al. | |
| 7,173,651 B1 | 2/2007 | Knowles | |
| 7,411,493 B2 | 8/2008 | Smith | |
| 7,434,176 B1 | 10/2008 | Froloff | |
| 7,535,890 B2 | 5/2009 | Rojas | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,718,333 B2 | 5/2014 | Wolf et al. | |
| 8,724,622 B2 | 5/2014 | Rojas | |
| 8,874,677 B2 | 10/2014 | Rosen et al. | |
| 8,909,679 B2 | 12/2014 | Roote et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,443,227 B2 | 9/2016 | Evans et al. | |

(Continued)

FOREIGN PATENT DOCUMENTS

CA      2887596 A1      7/2015

OTHER PUBLICATIONS

"U.S. Appl. No. 14/691,249 Response filed Feb. 13, 2017 to Restriction Requirement dated Dec. 13, 2016", 8 pgs.

(Continued)

*Primary Examiner* — Samir A Ahmed
(74) *Attorney, Agent, or Firm* — Schwegman Lundberg & Woessner, P.A.

(57) ABSTRACT

A system and method for generate a mood log based on user images. In one embodiment, a system includes an image module that receives images taken by a user's mobile computing device and determines that a face of the user is included in the image, a mood module that determines a mood level of the user based on the face, and a log module that stores the mood level in a log of mood levels for the user.

19 Claims, 17 Drawing Sheets

(56) References Cited

U.S. PATENT DOCUMENTS

| | | |
|---|---|---|
| 9,489,661 B2 | 11/2016 | Evans et al. |
| 9,491,134 B2 | 11/2016 | Rosen et al. |
| 10,133,918 B1 | 11/2018 | Chang |
| 10,732,722 B1* | 8/2020 | Heraz ............... G06F 3/017 |
| 2002/0194006 A1 | 12/2002 | Challapali |
| 2003/0139654 A1 | 7/2003 | Kim et al. |
| 2004/0022432 A1 | 2/2004 | Hayata et al. |
| 2005/0069852 A1 | 3/2005 | Janakiraman et al. |
| 2005/0114142 A1 | 5/2005 | Asukai et al. |
| 2006/0115157 A1 | 6/2006 | Mori et al. |
| 2006/0170945 A1 | 8/2006 | Bill |
| 2007/0041644 A1 | 2/2007 | Kim et al. |
| 2009/0135188 A1* | 5/2009 | Ding ............. G06K 9/00899 |
| | | 345/473 |
| 2009/0310828 A1 | 12/2009 | Kakadiaris et al. |
| 2010/0086204 A1 | 4/2010 | Lessing |
| 2011/0137137 A1 | 6/2011 | Shin et al. |
| 2011/0158540 A1 | 6/2011 | Suzuki et al. |
| 2011/0202598 A1 | 8/2011 | Evans et al. |
| 2011/0311112 A1 | 12/2011 | Matsuyama et al. |
| 2012/0136219 A1 | 5/2012 | Huang et al. |
| 2012/0209924 A1 | 8/2012 | Evans et al. |
| 2012/0223952 A1 | 9/2012 | Kanemaru et al. |
| 2012/0323087 A1 | 12/2012 | Leon Villeda et al. |
| 2013/0018837 A1 | 1/2013 | Lee |
| 2013/0121591 A1 | 5/2013 | Hill |
| 2014/0063236 A1* | 3/2014 | Shreve ............... G06K 9/00228 |
| | | 348/143 |

OTHER PUBLICATIONS

"U.S. Appl. No. 14/691,249, Final Office Action dated Sep. 29, 2017", 14 pgs.

"U.S. Appl. No. 14/691,249, Non Final Office Action dated Mar. 8, 2018", 11 pgs.

"U.S. Appl. No. 14/691,249, Non Final Office Action dated Apr. 5, 2017", 16 pgs.

"U.S. Appl. No. 14/691,249, Notice of Allowance dated Jul. 16, 2018", 9 pgs.

"U.S. Appl. No. 14/691,249, Response Filed Jun. 8, 2018 to Non Final Office Action dated Mar. 8, 2018", 12 pgs.

"U.S. Appl. No. 14/691,249, Response Filed Jul. 5, 2017 to Non Final Office Action dated Apr. 5, 2017".

"U.S. Appl. No. 14/691,249, Restriction Requirement dated Dec. 13, 2016", 6 pgs.

Leyden, John, "This SMS will self-destruct in 40 seconds", URL: http://www.theregister.co.uk/2005/12/12/stealthtext/, (Dec. 12, 2005), 1 pg.

* cited by examiner

300

| 320 | 322 |
|---|---|
| HAPPY 6 | HAPPY 3 |

| 324 | 326 |
|---|---|
| HAPPY 1 | SAD 2 |

*FIG. 3*

GENERATING A MOOD LOG BASED ON USER IMAGES

PRIORITY CLAIM

This application is a continuation of and claims the benefit of priority of U.S. patent application Ser. No. 14/691,249, filed on Apr. 20, 2015, which is hereby incorporated by reference herein in its entirety.

TECHNICAL FIELD

Embodiments of the present disclosure relate generally to mobile computing technology and, more particularly, but not by way of limitation, to generating a mood log based on user images.

BACKGROUND

Text messages and/or pictographs are a popular form of expression in digital communications. Users of various mobile computing devices frequently take pictures of themselves and their surroundings. In some examples, the user desires to share their experience with other users of a social messaging system. Messages between users frequently include an image of the user sending the message.

Technological advances in facial recognition allow an image processing system to determine an emotion of a user based on an image of the user's face. In some scenarios, an image processing system may be more sensitive than a human.

BRIEF DESCRIPTION OF THE DRAWINGS

Various ones of the appended drawings merely illustrate example embodiments of the present disclosure and should not be considered as limiting its scope.

FIG. 3 is a set of illustrations depicting various moods, according to some example embodiments.

Figure 1:
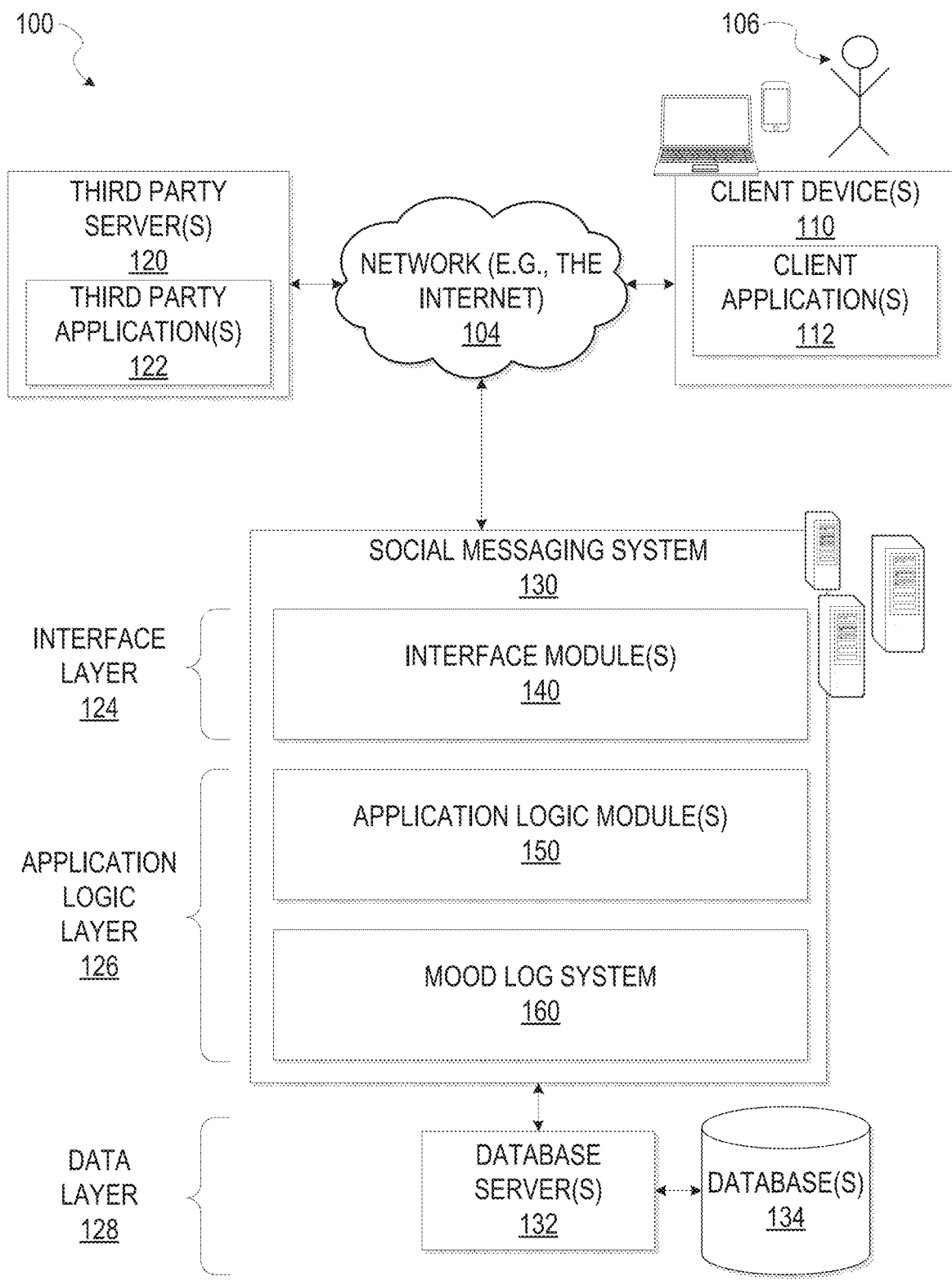
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In this disclosure, many different systems and methods are described for generating a mood log for a user of a social messaging system. In one embodiment, a mood log system receives images taken by a user's mobile computing device. The mood log system determines, in response to an image being received, that a face of the user is included in the image, and the mood log system then determines a mood level for the user based on the face. The mood level includes a mood and an intensity of the mood. The mood log system then stores the mood level in a log of mood levels for the user. Therefore, according to certain embodiments, a system may generate a mood log for the user based, at least in part, on the user's social messaging activity with a social messaging system.

In some embodiments, a social messaging application (e.g., SNAPCHAT®) executing on user's mobile computer devices is designed to capture images taken by the device. In such embodiments a user captures an image (e.g., a still image, animated image, video, or the like, via an image sensor of the user device) and composes a message using the social messaging application.

Because the nature of the social messaging application is to communicate using images, the messages passed between users of the social messaging application frequently include the user's face (e.g. "selfies", images with the user and friends, or similar). The mood log system, as described herein, analyzes these communications between users to track a mood level for each user. Therefore, the user does not need to perform any specific action, but may continue using the social messaging application without concern for the mood log system.

Furthermore, technical advances in facial recognition make it possible for a mood log system (e.g. system 160 of FIG. 1) to determine an emotion of a user using an image of the user's face. Such a mood log system 160 may also determine an intensity level of the emotion. For example, a happiness rating may be from 0 to 5 and the mood log system 160 could determine that the user has a happiness rating of 2. Of course, this disclosure is not limited in this regard and any scale of level of an emotion may be used as will be further described.

The mood log system 160, as will be further described, receives images taken by a user of the social messaging system. In response to the user taking an image, the mood log system 160 determines whether a face of the user is included in the image. If the user's face is included in the image, the mood log system 160 determines a mood level for the user and stores the mood level in a log of mood levels.

A user, as described herein, may or may not be aware of his/her emotions. Also, although a user may be aware of his/her emotions, the awareness may be limited in granularity. Due to advances in facial recognition technology and emotion determination, the mood log system 160 can be more accurate than the user in determining an emotion for the user based on an image of the user's face. For example, a mood log system 160 as described herein may be more sensitive to mood variations than the user. Therefore, such a log of emotions for the user provides detailed information regarding the user's emotions that may exceed the awareness of the user. Therefore, the user may consult the log of emotions to more accurately discover various emotional levels experienced by the user in different scenarios and/or environments. Accordingly, the mood log system 160 offers heightened awareness to the user regarding his/her emotional state. In one example, the mood log system 160 determines emotions as extrapolations of various states of the user based on image recognition patterns using images of the user's face as will be further described.

In another embodiment, the mood log system 160 coordinates a current mood for the user with a current event being experienced by the user. For example, the mood log system 160 tracks a user's mood as the user interacts with other people and generates a graphical representation for the user based on the interactions. This allows the user to discover deeper emotional information regarding the relationship between the user and the other person. For example, if a user's mood is heightened (e.g. happier) when interacting with the other person, the mood log system 160 may indicate that the user prefers interacting with that other person. In another example, if the user's mood is lowered (e.g. more sad), then the mood log system 160 may indicate to the user that interactions with that person result in less emotional satisfaction. Such indicators and/or recommendations are beneficial for a person when making decisions regarding which people to interact with on a regular basis (e.g. selection of friends, people to invite to parties, or the like).

FIG. 1 is a network diagram depicting a network system 100 having a client-server architecture configured for exchanging data over a network, according to one embodiment. For example, the network system 100 may be a messaging system where clients may communicate and exchange data within the network system 100. The data may pertain to various functions (e.g., sending and receiving text and media communication, determining geolocation, etc.) and aspects associated with the network system 100 and its users. Although illustrated herein as client-server architecture, other embodiments may include other network architectures, such as peer-to-peer or distributed network environments.

As shown in FIG. 1, the network system 100 may include a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. Of course, additional functional modules and engines may be used with a social messaging system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although the social messaging system 130 is depicted in FIG. 1 as a three-tiered architecture, the inventive subject matter is by no means limited to such architecture.

As shown in FIG. 1, the interface layer 124 consists of interface module(s) (e.g., a web server) 140, which receives requests from various client-computing devices and servers, such as client device(s) 110 executing client application(s) 112, and third party server(s) 120 executing third party application(s) 122. In response to received requests, the interface module(s) 140 communicates appropriate responses to requesting devices via a network 104. For example, the interface module(s) 140 can receive requests such as Hypertext Transfer Protocol (HTTP) requests, or other web-based, Application Programming Interface (API) requests.

The client device(s) 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the client device(s) 110 are executing the client application(s) 112. The client application(s) 112 can provide functionality to present information to a user 106 and communicate via the network 104 to exchange information with the social messaging system 130. Each of the client device(s) 110 can comprise a computing device that includes at least a display and communication capabilities with the network 104 to access the social messaging system 130. The client device(s) 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. One or more user(s) 106 can be a person, a machine, or other means of interacting with the client device(s) 110. In some embodiments, the user(s) 106 interact with the social messaging system 130 via the client device(s) 110. The user(s) 106 may not be part of the networked environment, but may be associated with the client device(s) 110.

As shown in FIG. 1, the data layer 128 has one or more database server(s) 132 that facilitate access to one or more information storage repositories or database(s) 134. The database(s) 134 are storage devices that store data such as member profile data, social graph data (e.g., relationships between members of the social messaging system 130), and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic module(s) 150, which, in conjunction with the interface module(s) 140, generate various user interfaces with data retrieved from various data sources or data services in the data layer 128. Individual application logic module(s) 150 may be used to implement the functionality associated with various applications, services, and features of the social messaging system 130. For instance, a social messaging application can be implemented with one or more of the application logic module(s) 150. The social messaging application provides a messaging mechanism for users of the client device(s) 110 to send and receive messages that include text and media content such as images (including pictures and/or video). The client device(s) 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application server module(s) 150.

The mood log system 160, as will be further described, receives an image taken by a user's mobile computing device, determines that a face of the user is included in the image. In response to the user's face being included in the image, determines a mood level for the user where the mood level includes a mood and a mood intensity. The mood log system 160 then stores the mood level in a log of mood levels for the user.

In other example embodiments, the mood detection system 160 generates a graphical representation of the log of mood levels. In one example, the mood detection system transfers the image to a remote server and receives the mood level from the remote server.

In one embodiment, the image is a video and the mood detection system 160 determines the mood level of the user based on individual frames in the video. In another embodiment, the mood detection system 160 requests that the user provide an image that includes the user's face in response to no images being taken in a threshold period of time. This ensures that the mood log system 160 has consistent log entries over time.

In another embodiment, the mood detection system 160 associates a mood level with an interaction with another person. The mood detection system 160 can track a user's calls, messages, emails, or other interactions and may capture a mood level for the user concurrent with the interaction. Over time, as many mood levels are captured when interacting with another person, the mood detection system 160 determines a user's mood level associated with the other person. Furthermore, because a user may not be aware of his/her own emotions or mood levels, the mood log system 160 provides increased emotional awareness of the user's emotional relationship with the other person. In one embodiment, the mood log system 160 may classify the other person based on the user's mood level associated with the person as will be further described.

Figure 2:
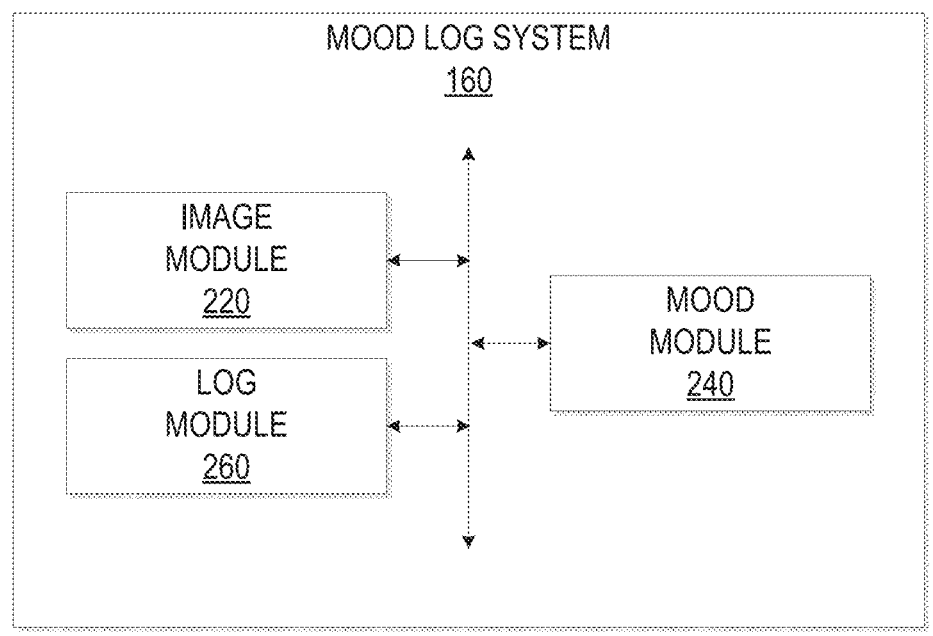
FIG. 2 is a block diagram illustrating one embodiment of a system for generating a mood log, according to some example embodiments.

FIG. 2 is a block diagram illustrating one embodiment 200 of a mood log system 160 for generating a mood log, according to some example embodiments. In one example embodiment, the mood log system 160 includes an image module 220, a mood module 240, and a log module 260.

In one example embodiment, the mood log system 160 operates as part of the client device 110. In another example embodiment, the mood log system 160 operates as part of the social messaging system 130. For example, the mood log system 160 may be implemented as part of one or more servers that cooperate to provide the social messaging service as described in FIG. 1.

All, or some, of the modules 220-260, communicate with each other, for example, via a network coupling, shared memory, or the like. Each module of modules 220-260 can be implemented as a single module, combined into other modules, or further subdivided into multiple modules. Other modules not pertinent to example embodiments can also be included, but are not shown.

In one embodiment, the image module 220 is configured to receive an image taken by a user's mobile computing device. Of course, one skilled in the art may recognize a wide variety of different ways in which an image may be received and this disclosure is meant to include all such ways.

According to specific examples, users of the social messaging system 130 want to share their experiences with contacts (e.g., friends or followers) on the social messaging system 130. The attendee captures an image or video (e.g., via an image sensor of the client device) and composes a message using a social messaging application executing on the client device 110 (e.g., SNAPCHAT®).

The user can then cause transmission of the message, including at least one selected image, to one or more message recipients who can view the message and the at least one selected pictographs. In some embodiments, pictographs included in the message 224 are image assets that are transmitted along with contents of the message 224. In other embodiments, the pictograph included in the message is a character code that a recipient device uses to identify the pictograph included in the message when the message is received (e.g., the pictograph is stored on the client device 110 prior to receipt of the message or is accessible to the recipient device upon receipt of the message).

In one embodiment, the image module 220 receives the pictographs that were taken. The image module 220 then determines, in response to receiving an image, that a face of the user is included in the image. In one example, the image module 220 uses facial recognition to determine whether a face in the image is the face of the user or is the face of another person. If the image of the user is not included in the received image, then image is discarded. If the image of the user is included in the received image, the image module 220 forwards the image to the mood module 240 for further processing.

In one example embodiment, the mood log system 160 includes the mood module 140. The mood module 140 is configured to determine a mood level of the user based on the face in a received image. The mood level at least includes, but is not limited to, a type of mood and an intensity of the mood. The mood type may be any mood type described in FIG. 7, or any other mood, emotion, sentiment, or the like. The mood intensity can be any numerical value and this disclosure is not limited in this regard.

In another example embodiment, the mood module 240 transmits the image to a remote server and receives the mood level from the remote server. For example, the mood log system 160 subscribes to a remote service for mood analysis. Therefore, in one embodiment, determining the mood level for the image of the user includes use of the remote service.

In one example embodiment, the received image is a video. According to this embodiment, the mood module 240 determines movements by the user in the video as one skilled in the art may appreciate. In mood module 240 may then include physical movements by the user in determining a mood level. For example, in response to the user consistently moving around in the video, the mood module 240 increases the mood level for the user. In response to the user not moving in the video, the mood module 240 decreases the mood level for the user.

In one example, the mood module 240 determines that the user is moving more than average based on a threshold number of movements in a period of time. In response to the user not exceeding the threshold number of movement in the period of time, the mood module 240 determines that the user is moving less than usual and decreases the mood level. The threshold number of movements may be received from the user or may default to a default value set by the mood log system 150. For example, in one embodiment the threshold number of movements is 1 movement per second.

In one example embodiment, the log module 260 is configured to store the mood level in a log of mood levels for the user. In certain examples, the log module 260 stores the mood levels in a text file, a binary file, or any other file format as one skilled in the art may appreciate. In another example, the log module 260 stores the mood levels by inserting the mood levels in a database of mood levels for the user. Of course, the database may be local to the mood log system 150, but this disclosure is not limited in this regard as the database may be stored anywhere and accessed over a network connection.

Figure 4:
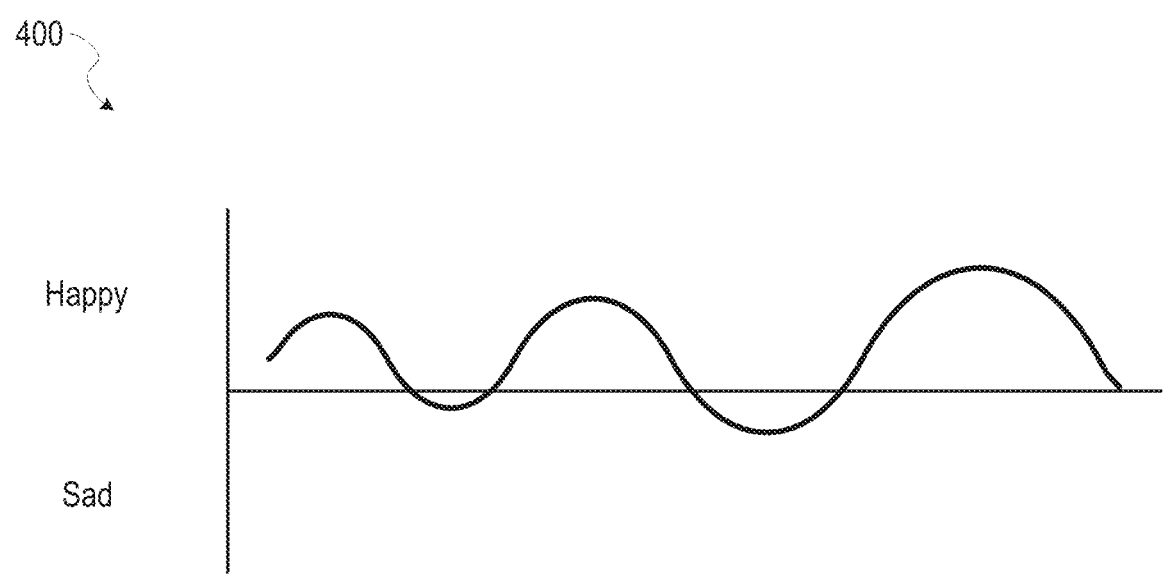
FIG. 4 is a plot illustrating an example of a mood over time, according to one example embodiment.
Figure 5:
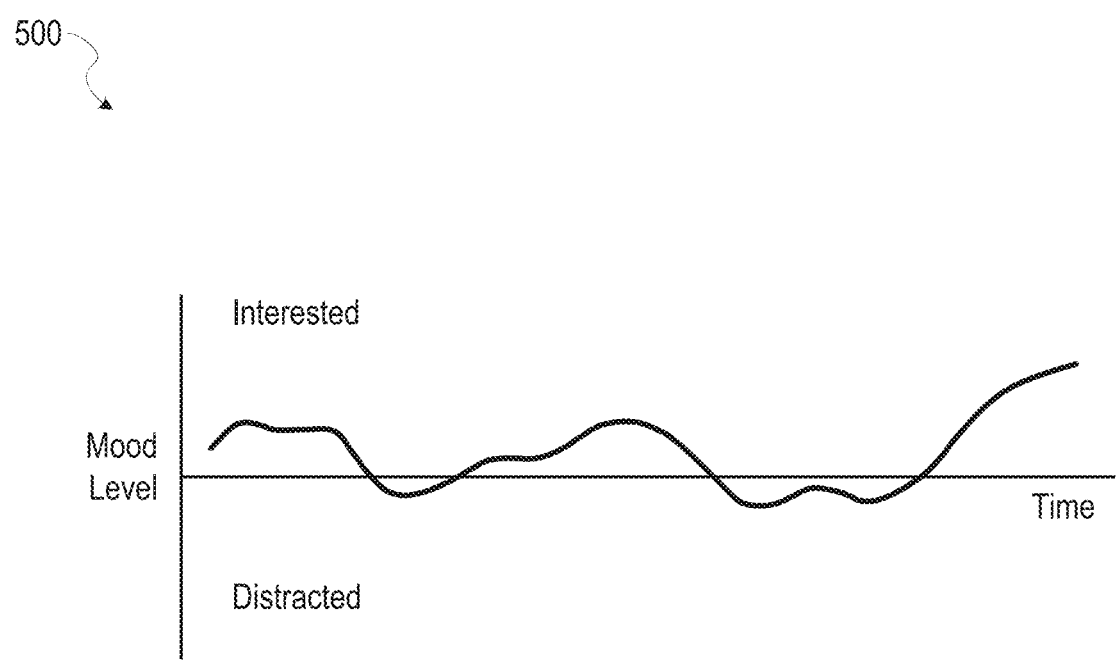
FIG. 5 is a plot illustrating an example of a mood over time, according to one example embodiment.
Figure 9:
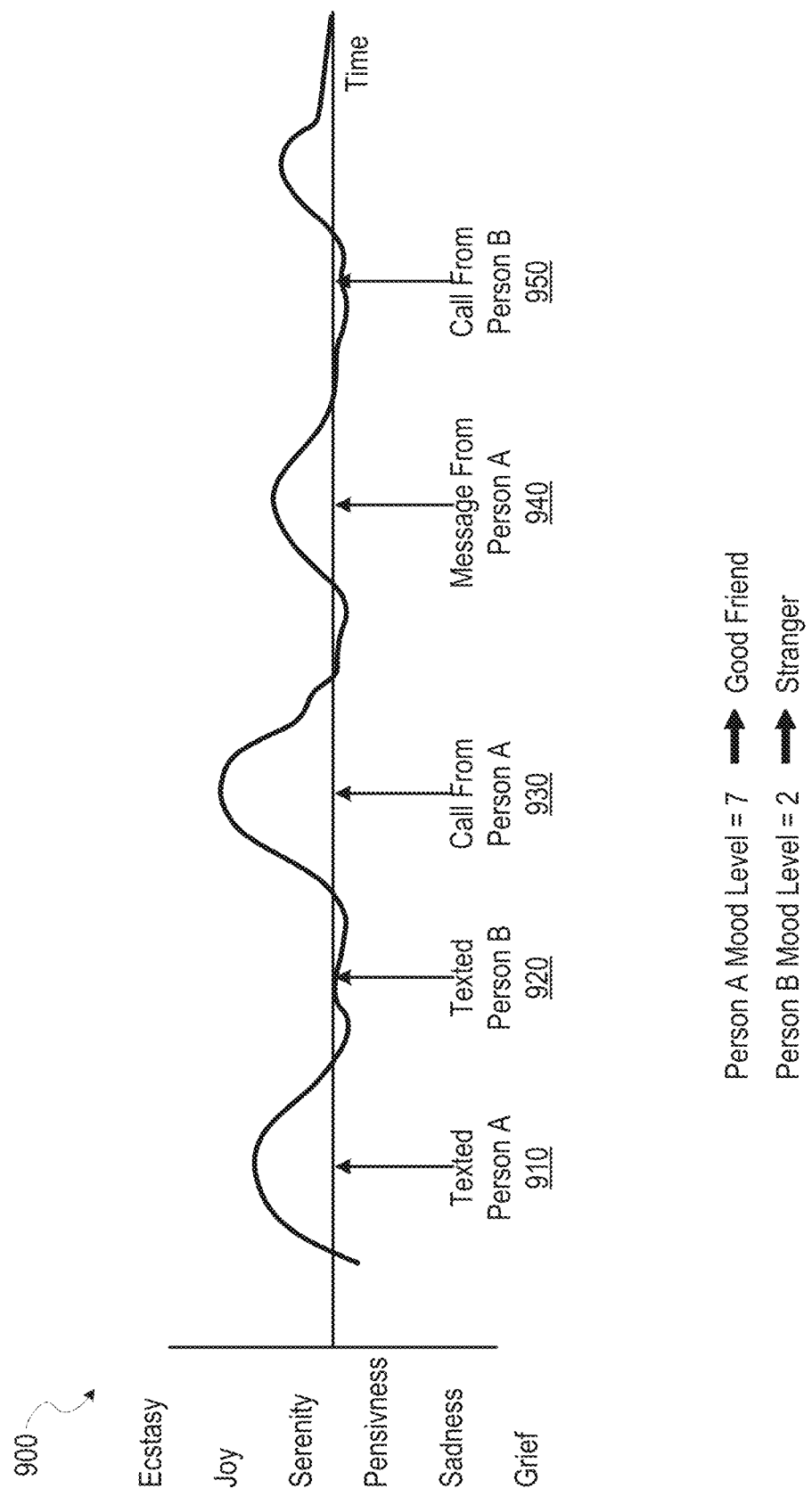
FIG. 9 is a plot illustrating one example of various emotions for a user based on user events, according to one example embodiment.

In another example embodiment, the log module 260 generates a graphical representation of the log of mood levels. Specific examples of graphical representations are depicted in FIG. 4, FIG. 5, and FIG. 9. In one example, the log module 260 generates a timeline plot of the mood levels of the user. For example, the log module 260 generates a weekly plot of the mood levels indicated by the user as described herein.

According to an emotional model (e.g. the emotional model depicted in FIG. 7), the log module 260 generates a graphical representation of emotionally opposing moods. For example, joy opposes sadness, distraction opposes interest, and the like. The log module 260 generates charts for moods that are in opposition.

In another example embodiment, the log module 260 captures an image from a camera concurrent with an event occurring at the client device 110. For example, in response to the user sending a text message, the log module 260 captures an image of the user. In another example, in response to receiving a call from another, the log module 260 captures an image of the user. If the image includes the face of the user, the mood module 240 determines a mood level for the user and the log module 260 associates the mood level with the person the user is interacting with.

Therefore, the log module 260 captures a mood level for the user based on an interaction with another person. The log module 260 then aggregates the mood levels for the other person and may notify the user regarding the user's average mood level when interacting with the other person. In this way, the log module 260 provides increased emotional awareness regarding the emotions felt when interacting with the other person.

In another example embodiment, the log module 260 classifies the other user based on the average mood when interacting with the other person. For example, in response to interactions with the other person resulting in an average mood of "happy level 3," the mood module 240 classifies the other person as a friend. In another example, in response to interactions with the other person resulting in an average mood of "sad level 1," the mood module 240 classifies the other person as a stranger.

Of course, one skilled in the art may recognize other ways to classify other persons based on emotions felt by the user. For example, the log module 260 may receive classifications of persons, such as, but not limited to, enemy, stranger, friend, best friend, lover, or the like. The log module 260 may also receive threshold values for each of the classifications. For example, the user may indicate that happy level 4 means a friend, and happy level 6 or higher is a best friend. Of course, this disclosure is not limited in this regard as a user may indicate any specific parameters for classifying others based on a mood level of the user when interacting with the other person.

The event module 220 can allow for various fee structures to charge the third party entity in addition to those described above. For instance, the third party entity can be charged per location of use of the mood detection system 160, pay for exclusive, or partially exclusive, use of the aggregate mood level.

FIG. 3 is a set of illustrations depicting various moods, according to some example embodiments. The various images depict certain mood levels for the user as will be explained.

In one embodiment, the mood of the user is selected from a set of predefined emotions. An emotion of a user may include, but is not limited to, anger, fear, grief, joy, or other, or the like. In further examples, a level of the emotion may include a numeric value or textual description. A textual description may also be mapped to a predefined numeric value. For example, happiness may be defined in various levels, such as, glad (value=1), cheery (value=2), happy (value=3), ecstatic (value=4), overjoyed (value=5). Of course, other levels and/or descriptions may be used and this disclosure is not limited in this regard. Furthermore, other emotions may be defined that may not map to a textual description in the English language and an emotion may also be mapped to other emotions using terms in any other language.

In one embodiment, the mood module 260 determines a numeric value for each of the moods. The numeric value may be according to a predefined value. For example, where the attendee describes his/her mood as "ecstatic," the mood module 260 may lookup "ecstatic" in a list of predefined moods and determine that the numeric value of the user's mood is 4 as previously described.

In one embodiment, the mood module 260 determines a numeric value for each of the images received by the image module 220. The numeric value for each indicator indicates an intensity of the emotion of the attendee 106. In one example, each emotion may have a scale from 0 to 5. Of course, this disclosure is not limited in this regard. Further, more specific examples, of various emotional ranges are described in FIG. 7.

In another embodiment, the indicators are images of an attendee's face. The mood module 260 determines a mood for each of the faces in the image and also determines a numeric level for the mood. The mood module 260 identifies one or more regions for the user's face and adds points to each region. The points define regions of each face, such as, but not limited to, a mouth, a nose, eyes, eyebrows, and other facial features.

As one skilled in the art may appreciate points that define some regions will move more than points around other regions. For example, points that define a region for the mouth move more than points that define a region for a nose. Therefore, the mood module 260 uses points that move little (e.g. points for the nose) as a point of reference to determine how much other points move (e.g. points around the eyes) as the attendee expresses certain emotions.

In certain example embodiments, the mood module 260 further determines emotions of an attendee based on a distribution of points for the attendee's face. In one example, the distribution of points indicates locations of wrinkles around the eyes, a furrow of an eyebrow or other locations of facial components.

In another embodiment, the mood module 260 compares the distribution of points for an attendee's face with a database of facial expressions. The database server (FIG. 1: 132), may store many sets of data for point distributions representing a large population of people and their facial expressions. For example, the database (FIG. 1: 134) stores data records for distributions of data points for various facial expressions as described herein.

In certain examples, an emotion of happy is indicated by raised corners of the mouth. In other examples, sadness is indicated by lowered corners of the mouth, lowered eyebrows, or the like as indicated by a data model. Furthermore, a magnitude of the emotion may be indicated by the locations of the points. Therefore, a bigger smile indicates more happiness. Being frightened is indicated by an open mouth and wide open eyes. Of course, as data models evolve over time, many other emotions may be determined based on facial expressions, data regions on a face, or the like as described herein. In one embodiment, the facial expressions may be encoded according to a standard coding system for facial actions and/or expressions. Of course, this disclosure is not limited in this regard.

In another embodiment, the mood module 260 further considers data received from other biometric sensors (FIG. 17: 1756) to determine an emotion for an attendee. For example, a biosignal, biorhythm, or the like, may indicate a raised heart rate, other increased electrical signals, or the like which indicates heightened emotional experience which raises the mood level for the attendee. Of course, one skilled in the art may recognize other ways in which a biometric sensor may indicate an emotion or mood by an attendee and this disclosure is meant to include all such ways.

In one example, an image 320 received includes a face of the user with an open mouth, widened eyes, and raised eyebrows. These three positions of facial features indicate a happiness level of six. In another example, an image 322 includes a less open mouth as compared with image 320. According to an emotional model, these positions of facial features may indicate a happiness level of three.

In another image 324, the user's eyes may not be as wide open. According to a database of facial position, this may indicate a happiness level of one. In another image 326, the corners of the mouth may be turned downwards and the eyes may be more closed which indicates a sadness level of two, according to database of facial positions. Of course, other configurations of facial features indicate other mood levels and this disclosure is meant to include all such configurations.

FIG. 4 is a plot 400 illustrating an example of a mood level over time, according to one example embodiment. In this example, the plot depicts opposing moods happiness and sadness. The scale of the plot may be any scale consistent with the range of values used to represent the various mood levels. Therefore, this disclosure is not limited regarding a range of the plot.

In one embodiment, the log module 260 generates a chart to depict the emotions of the user. For example, the log module 260 generates a pictorial representation of a mood level over time. As previously described, the plot may be of a most recent number of days, a most recent week, a current month, or any other period of time. As the image module 220 receives images from the user, the mood module 240 determine a mood level for each image, and the log module 260 stores the mood levels in a log of mood levels. The plot 400, in one example, presents each of the mood levels in the log of mood levels in the period of time specified.

FIG. 5 is a plot 500 illustrating an example of a mood over time, according to one example embodiment. In this example, the plot depicts opposing moods interest and distraction. The scale of the plot may be any scale consistent with the range of values used to represent the various mood levels. Therefore, this disclosure is not limited regarding a range of the plot.

In one embodiment, the log module 260 generates a chart to depict the emotions of the user. For example, the log module 260 generates a pictorial representation of a mood level over time. As previously described, the plot may be of a most recent number of days, a most recent week, a current month, or any other period of time. As the image module 220 receives images from the user, the mood module 240 determine a mood level for each image, and the log module 260 stores the mood levels in a log of mood levels. The plot 500, in one example, presents each of the mood levels in the log of mood levels in the period of time specified.

Figure 6:
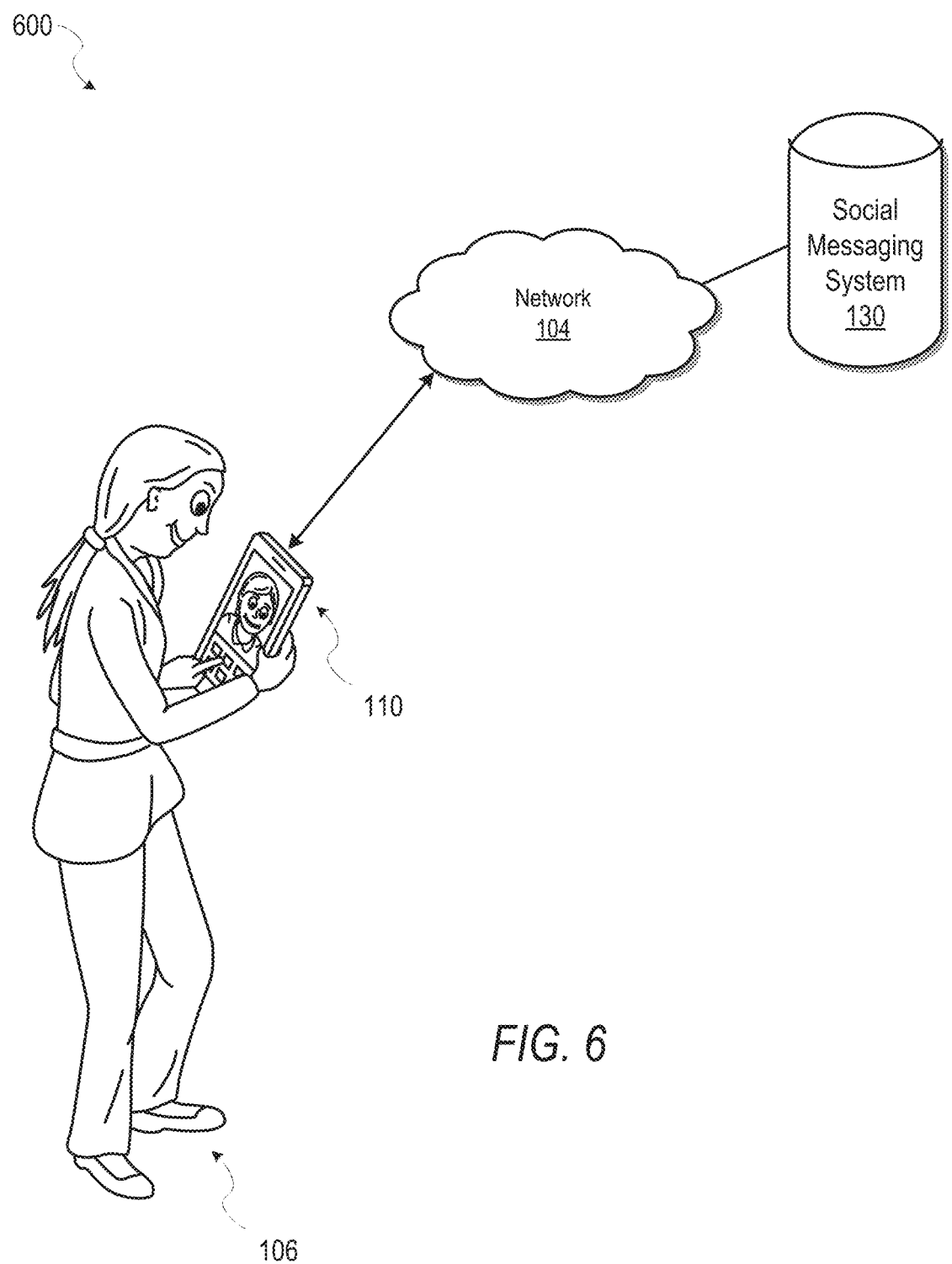
FIG. 6 is a diagram illustrating an example scenario for generating a mood log, according to some example embodiments.

FIG. 6 is a diagram illustrating an example scenario 600 for generating a mood log, according to some example embodiments. According to this embodiment, the user 106 causes the client device 110 to capture an image of the user's face while constructing a message to another user of the social messaging system 130.

As the user 106 interacts with the social messaging system 130, the image module 220, operating as part of the social messaging system 130, captures messages sent by the user and the mood module 240 determines whether a face of the user is included in the image as previously described.

For example, as the user composes messages and includes an image of the user in the message, the user may cause the message to be transmitted from the client device 110, over the network 104, and to the social messaging system. The social messaging system 130 forwards the message to recipients of the message, however, the mood log system 160 may perform one or more functions using the image included in the message as described herein.

Figure 7:
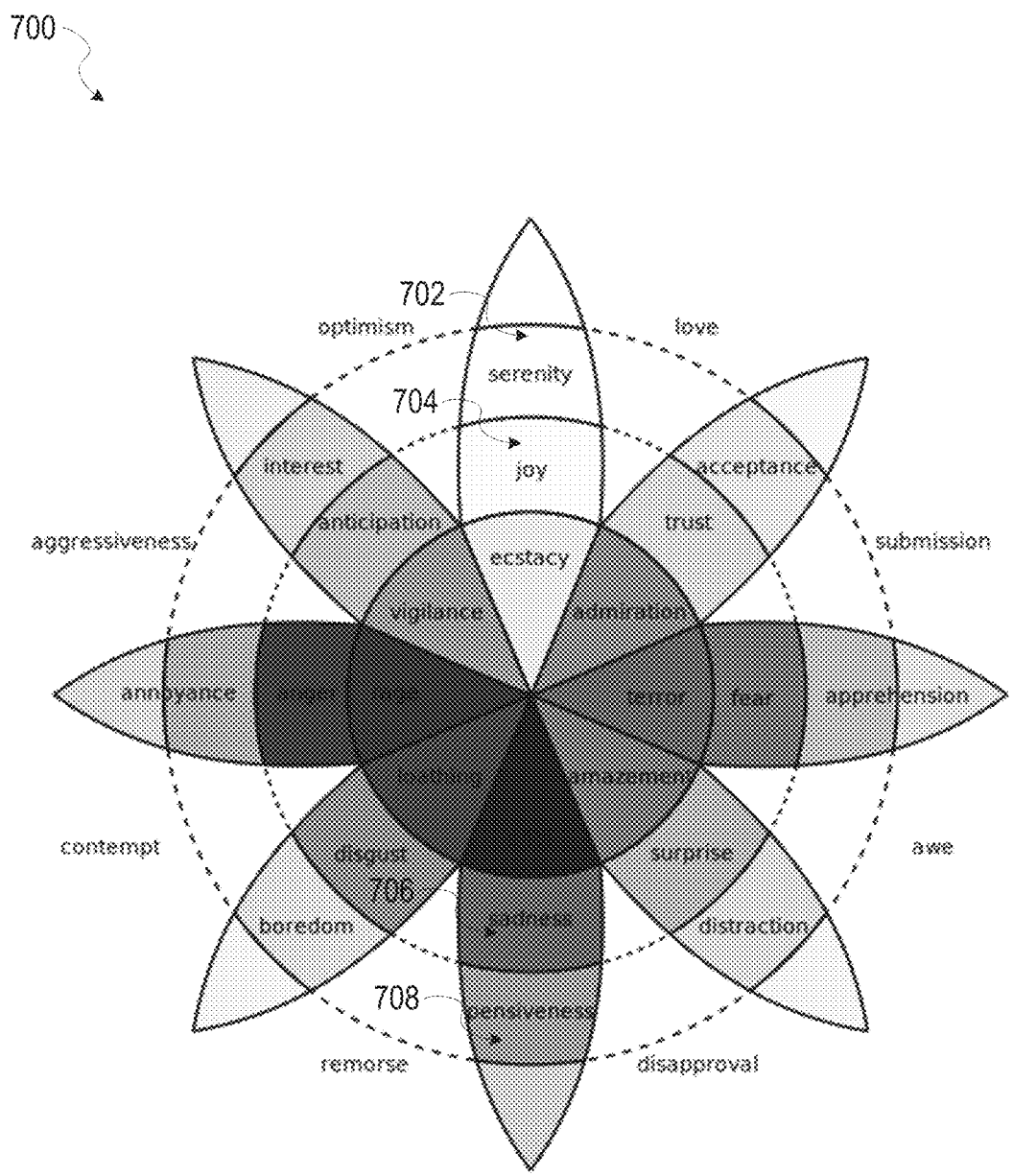
FIG. 7 is a diagram illustrating an example of an emotional model, according to some example embodiments.

FIG. 7 is a diagram illustrating an example of an emotional model, according to some example embodiments. In one example, a model of emotions is according to Robert Plutchhik's theory as depicted in FIG. 7 and/or as one skilled in the art may appreciate. Of course, other emotional models may be used and this disclosure is not limited in this regard.

FIG. 7 illustrates a specific emotional model for identifying emotions and their respective interrelations. For example, as depicted in FIG. 7, the emotions of serenity 702, joy 704 and ecstasy oppose grief, sadness 706, and pensiveness 708. Furthermore, more intense emotions, such as, but not limited to, loathing, rage, and terror may be located in an inner circle of emotions and less intense emotions may be located outside of the inner circle. Therefore, one scale of emotions may include (in order), grief, sadness, pensiveness, serenity, joy, and ecstasy.

In one example, a happiness range includes numerical values, such as grief (−3), sadness (−2) 706, pensiveness (−1) 708, serenity (1) 702, joy (2) 704, ecstasy (3). A similar range of an emotion such as "like" includes loathing (−3), disgust (−2), boredom (−1), acceptance (1), trust (2), admiration (3). In another example, an emotional range for interest is vigilance (−3), anticipation (−2), interest (−1), distraction (1), surprise (2), amazement (3). Of course, other emotions and/or ranges of emotion may be defined and used by the mood module 260 to determine a numeric value for an emotional indicator.

In another example, the mood module 260 may determine some emotions on a happiness scale and other emotions on a fear scale. In this example, because the emotions of happiness and fear to not directly oppose each other, the mood module 240 separates the separate emotions. The log module 260 may generate graphical representations of each of the separate emotions, or emotions that oppose each other.

Figure 8:
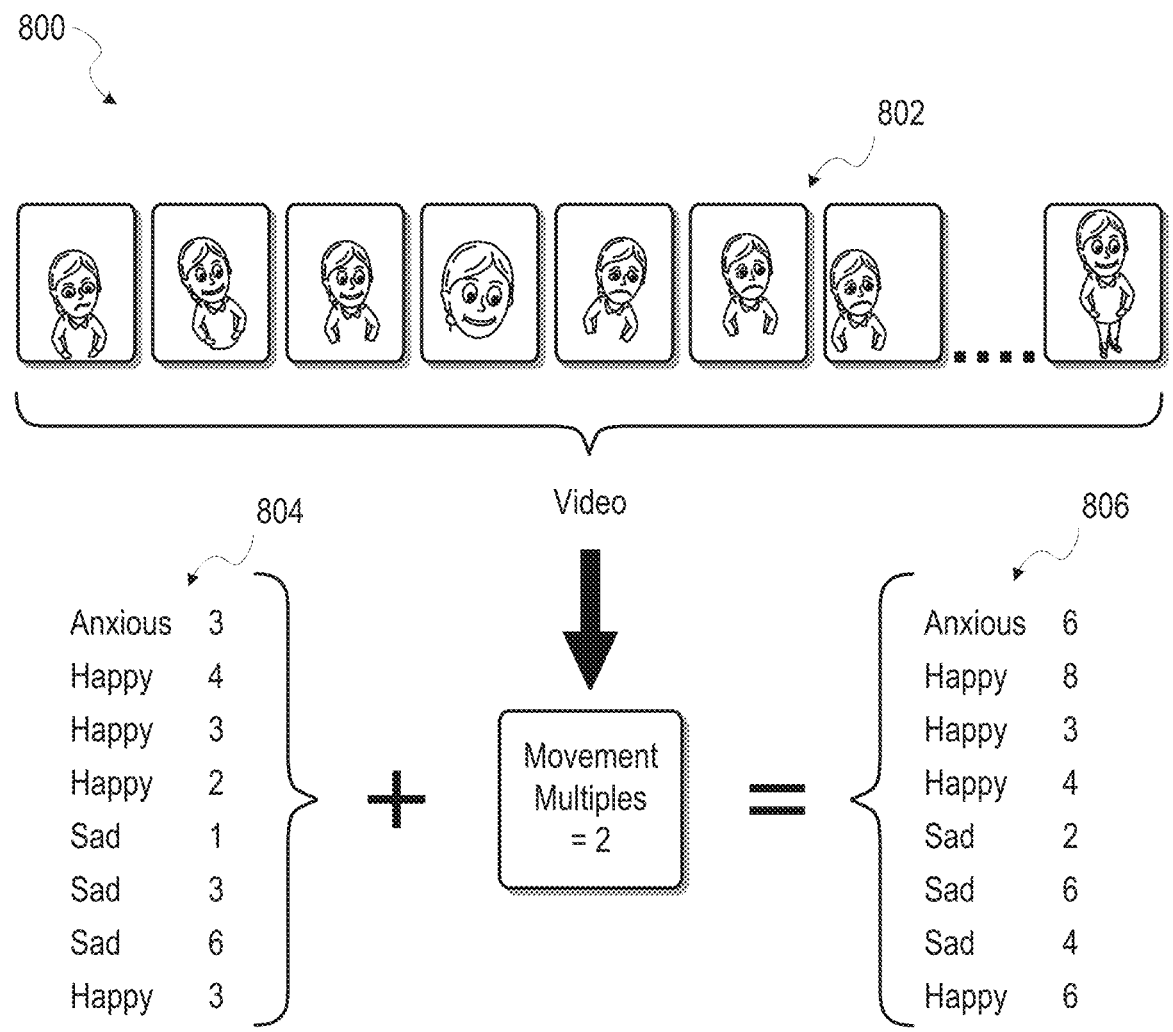
FIG. 8 is a chart illustrating one example of a mood log based on a video, according to one example embodiment.

FIG. 8 is a chart illustrating one example 800 of a mood log based on a video, according to one example embodiment. According to this embodiment, the mood module 240 further determines an amount of movement by the user in the video.

In one embodiment, the image module 220 samples the video at regular intervals to generate still images. For example, the image module 220 samples the video every 10 seconds resulting in a series of images (e.g. the images 802). Therefore, receiving one or more images from the user may include the image module 220 receiving images in a video based format.

In one example, the mood module 240 determines respective mood levels 804 for the images 802 in the video. For example, the in 8 images received, the mood module 240 determines the corresponding mood levels 804 as previously described. In another example embodiment, the image module 220 discards images from the video that did not include the user's face.

In one embodiment, in response to the user moving above a threshold number of times per unit time, the mood module 240 may increase the intensity of the mood level. In one example, in response to a location of the user's face changing locations more than 5 times in 10 seconds, the user may be moving more than normal (e.g. according to an average amount of movement for the user). Accordingly, the mood module 240 increases the intensity of the mood level.

In one embodiment, in response to the user exceeding a threshold amount of movement, the mood module 240 multiplies the intensity of the determined mood levels 804. For example, in response to the user moving around twice as much as normal (e.g. according to an average movement pattern), the mood module 240 multiplies each of the mood levels from the video by two. This results in respective mood levels 806 which are twice as intense as the previous mood levels 804. Of course, other multipliers may be used and this disclosure is not limited in this regard.

FIG. 9 is a plot illustrating one example 900 of various emotions for a user based on user events, according to one example embodiment. The plot, as illustrated in FIG. 9, includes a range of opposing emotions as previously described. For example, the plot ranges from grief to ecstasy.

As previously described, the mood module 240 determines a mood level for the user in response to receiving an image that includes the user's face. Furthermore, the log module 260 tracks user interactions with other persons. For example, when texting others, calling others, receiving notifications regarding others, or other interactions.

In one embodiment, image module 120 monitors the client device 110 and captures an image from a camera of the client device in response to an interaction with another person. Furthermore, the log module 260 can store a time stamp for each mood level to provide additional accuracy regarding a user's mood relative to a user's interaction with another person.

In one example, as the user texted 910 a first person A, the image module 220 captures an image in response to the user texting person A. The mood module 240 determines the mood level, and the log module 260 stores the mood level and the identification of person A. The log module 260 further stores a name, number, or other identifying information. At a later time, the user may receive a call 930 from person A. and the mood module 240 may similarly determine a mood level for the user at the time of this interaction. Because the average mood level for the user when interacting with person A, is seven (e.g. between the "serenity" mood level and the "joy" mood level), the log module 260 notifies the user that interactions with person A causes an increased emotional response.

In another example, as the user texts 920 a second person B, the image module 220 captures an image in response. The mood module 240 determines the mood level, and the log module 260 stores the mood level and the identification of person B. The log module 260 further stores a name, number, or other identifying information. At a later time, the user may receive a call 950 from person B. and the mood module 240 may similarly determine a mood level for the user at the time of this interaction. Because the average mood level for the user is closer to "pensiveness" than to "serenity," the log module 240 may notify the user that interactions with person B cause a negative emotional response.

In another example embodiment, the log module 260 classifies the other person based on an average mood level for the user when interacting with the other person. For example, if an average mood level for person A is seven, the log module 260 classifies the other person as a good friend. In another example, if an average mood level for the other person is two, the log module 260 classifies the other person as a stranger. Of course, other classifications may be used and the user may define emotional mood levels for each classification. Therefore, this disclosure is not limited regarding the number of classifications, mood levels, or threshold levels for the classifications.

Figure 10:
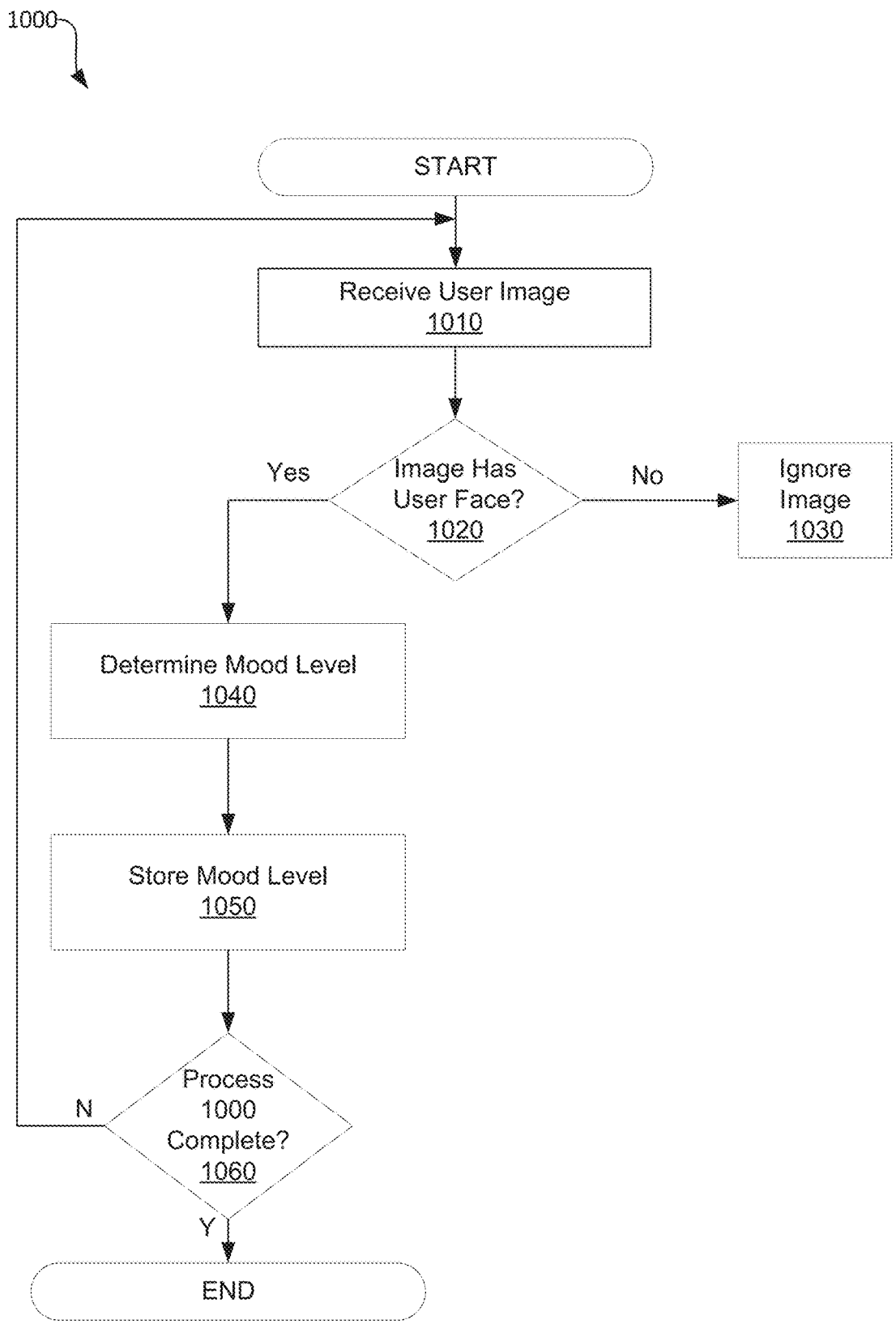
FIG. 10 is a flow diagram illustrating an example method, according to one example embodiment.

FIG. 10 is a flow diagram illustrating an example method, according to one example embodiment. The operations of the method 1000 may be performed by components of the mood detection system 160, and are so described below for the purposes of illustration.

The method 1000 begins and at operation 1010, the image module 220 receives an image taken by a user's mobile computing device. The method 1000 continues at operation 1020 and the image module 120 determines whether the user's face is included in the image. In response to the image not including the face of the user, the method continues at operation 1030 and the image module 220 ignores the image.

In response to the image including the face of the user, the method continues at operation 1040 and the mood module 240 determines a mood level of the user based on the face. The mood module 240 determines a mood for the user, and an intensity of the mood. The method 1000 continues at operation 1050 and the log module 260 stores the mood level in a log of mood levels for the user.

Figure 11:
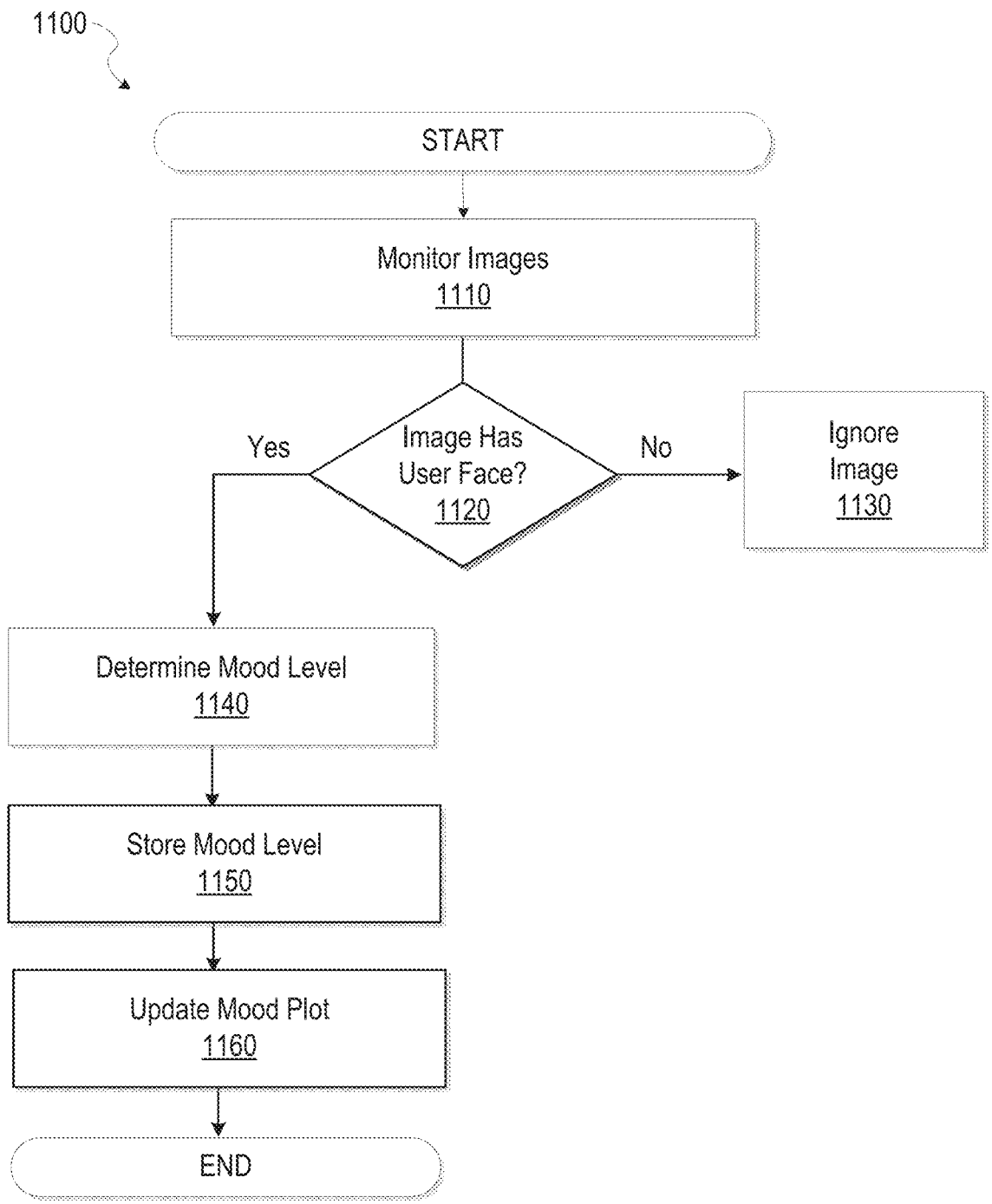
FIG. 11 is a flow diagram illustrating an example method, according to one example embodiment.

FIG. 11 is a flow diagram illustrating an example method, according to one example embodiment. The operations of the method 1100 may be performed by components of the mood log system 160, and are so described below for the purposes of illustration.

In one embodiment, the method 1100 begins and at operation 1110 the image module 220 monitors images taken by a user using the user's mobile computing device. The user's mobile computing device may be the client device 110. The method 1100 continues at operation 1120 and the image module 220 determines whether the user's face is included in the image. In response to the image not including the face of the user, the method continues at operation 1130 and the image module 220 ignores the image.

In response to the image including the face of the user, the method 1100 continues at operation 1140 and the mood module 240 determines a mood level of the user based on the face. The method 1100 continues at operation 1150 and the log module 260 stores the mood level in a log of mood levels for the user. The method 1100 continues at operation 1160 and the log module 260 updates a mood plot based on the determined mood level at operation 1140.

Figure 12:
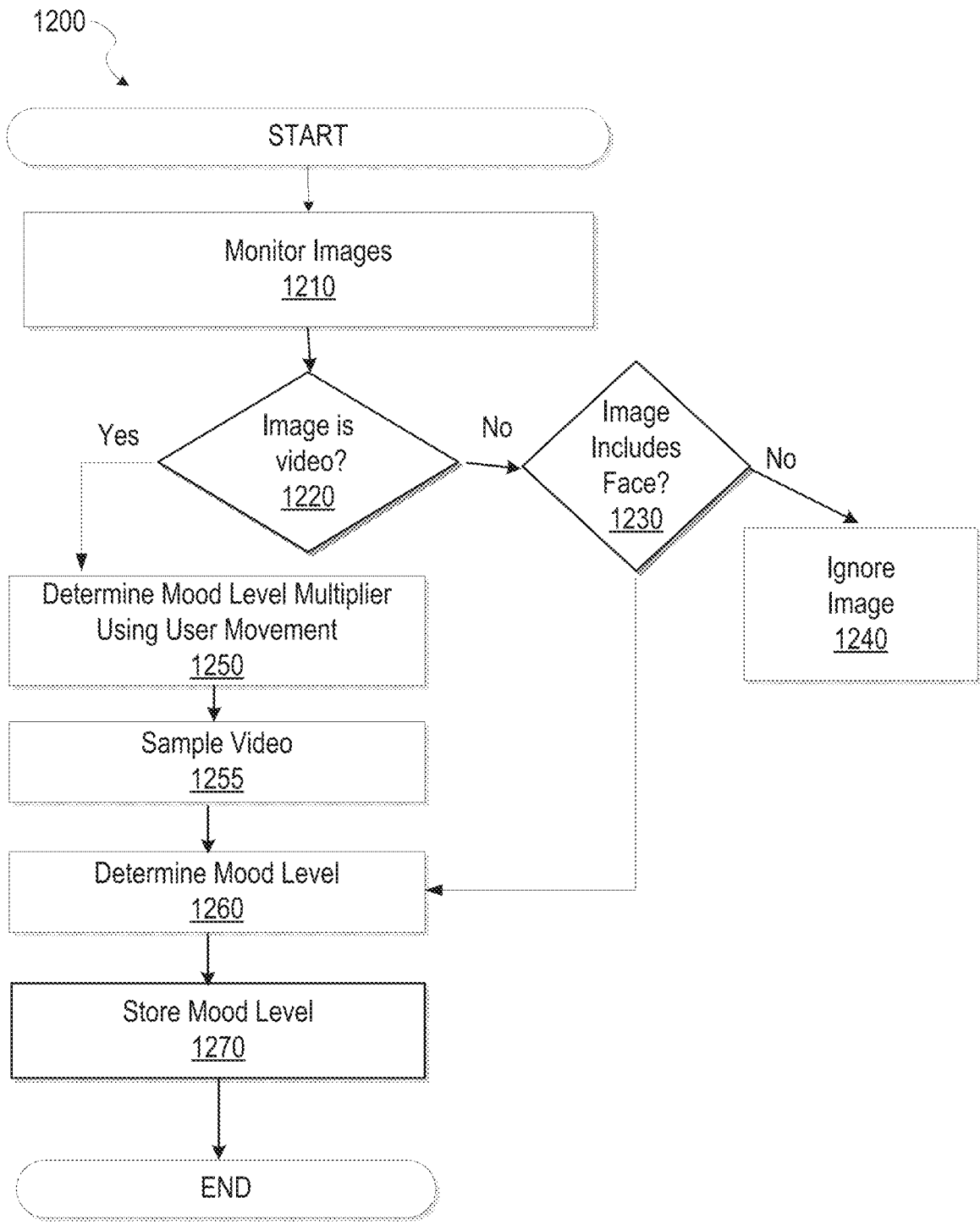
FIG. 12 is a flow diagram illustrating an example method for generating a mood log, according to some example embodiments.

FIG. 12 is a flow diagram illustrating an example method 1200 for generating a mood log, according to some example embodiments. The operations of the method 1200 may be performed by components of the mood log system 160, and are so described below for the purposes of illustration.

In one embodiment, the method 1200 begins and at operation 1210 the image module 220 monitors images taken by a client device 110. The method 1200 continues at operation 1220 and the image module 220 determines whether the image is a video. In response to determining that the image is not a video, the method 1200 continues at operation 1230 with the mood module 240 determining whether the image includes the user's face. If the image does not include the user's face, the method 1200 continues at operation 1240 and the mood module 240 ignores the image. If the image does include the user's face, the method 1200 continues at operation 1260 and the mood module 240 determines a mood level for the user based on the image.

In response to the image module 220 determining, at operation 1220, that the image includes video, the mood module 240 determines a mood level multiplier using user movement. The move level multiplier is used to modify the mood levels originating from images in the video. The method 1200 continues at operation 1255 and the image module 220 samples the video to generate one or more still images. The still images are based on frames of the video.

The method 1200 continues at operation 1260 and the mood module determines a mood level for the user based on the image. The method continues at operation 1270 and the log module 260 stores the mood level in a log of mood levels.

Figure 13:
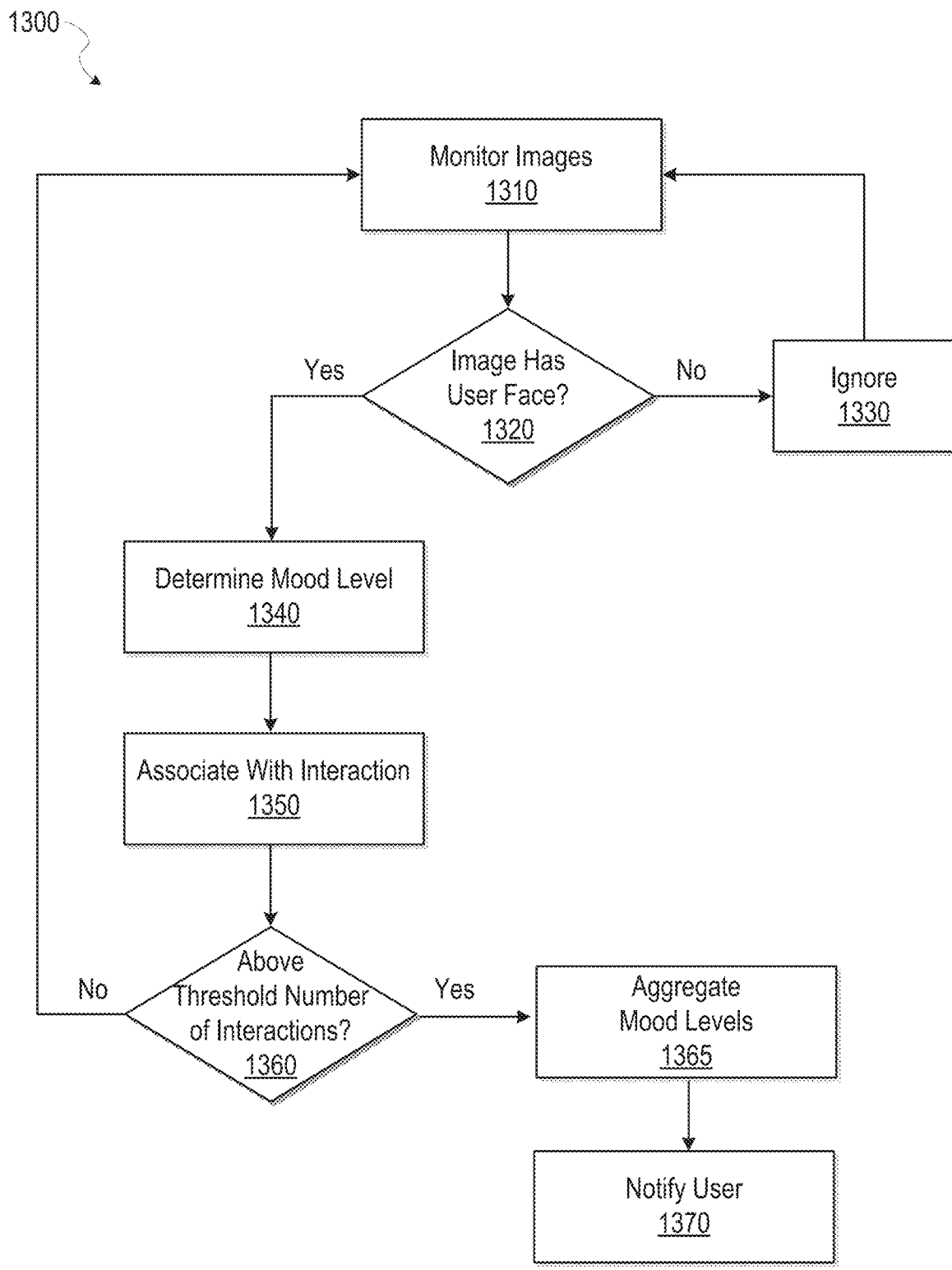
FIG. 13 is a flow diagram illustrating an example method for generating a mood log, according to some example embodiments.

FIG. 13 is a flow diagram illustrating an example method 1300 for generating a mood log, according to some example embodiments. The operations of the method 1300 may be performed by components of the mood log system 160, and are so described below for the purposes of illustration.

In one embodiment, the method 1300 begins and at operation 1310 the image module 220 monitors images taken by a client device 110. The method 1300 continues at operation 1320 and the image module 220 determines whether the image includes the user's face. In response to the image not including the user's face, the method 1300 continues at operation 1330 and the mood module 240 ignores the image.

In response to the image including the user's face, the method 1300 continues at operation 1340 and the mood module 240 determine a mood level for the user based on the user's face in the image. The method 1300 continues at operation 1350 and the log module 260 associates the mood level with an interaction between the user and another person. The method 1300 continues at operation 1360 and the log module 260 determines whether a number of interactions with the other person exceeds a threshold number.

In response to a number of logged interactions not exceeding a threshold number, the method 1300 continues at operation 1310 and the image module 220 monitors images taken by a client device 110. In response to the number of logged interactions exceeding the threshold number, the method 1300 continues at operation 1365 and the log module 260 aggregates mood levels associated with the other person. In one example, the log module 260 determines a statistical average of the mood level associated with the other person. In other examples, the log module 260 combines the associated mood levels in other statistical ways as one skilled in the art may appreciate. The method 1300 continues at operation 1370 and the log module 260 notifies the user regarding the determined aggregate mood level when interacting with the other person. In one example, the threshold number of interactions is 10. Therefore, at operation 1360, if a number of logged interactions with the other person exceeds 10 interactions, the method 1300 aggregates the mood levels at operation 1365 and notifies the user at operation 1370.

Figure 14:
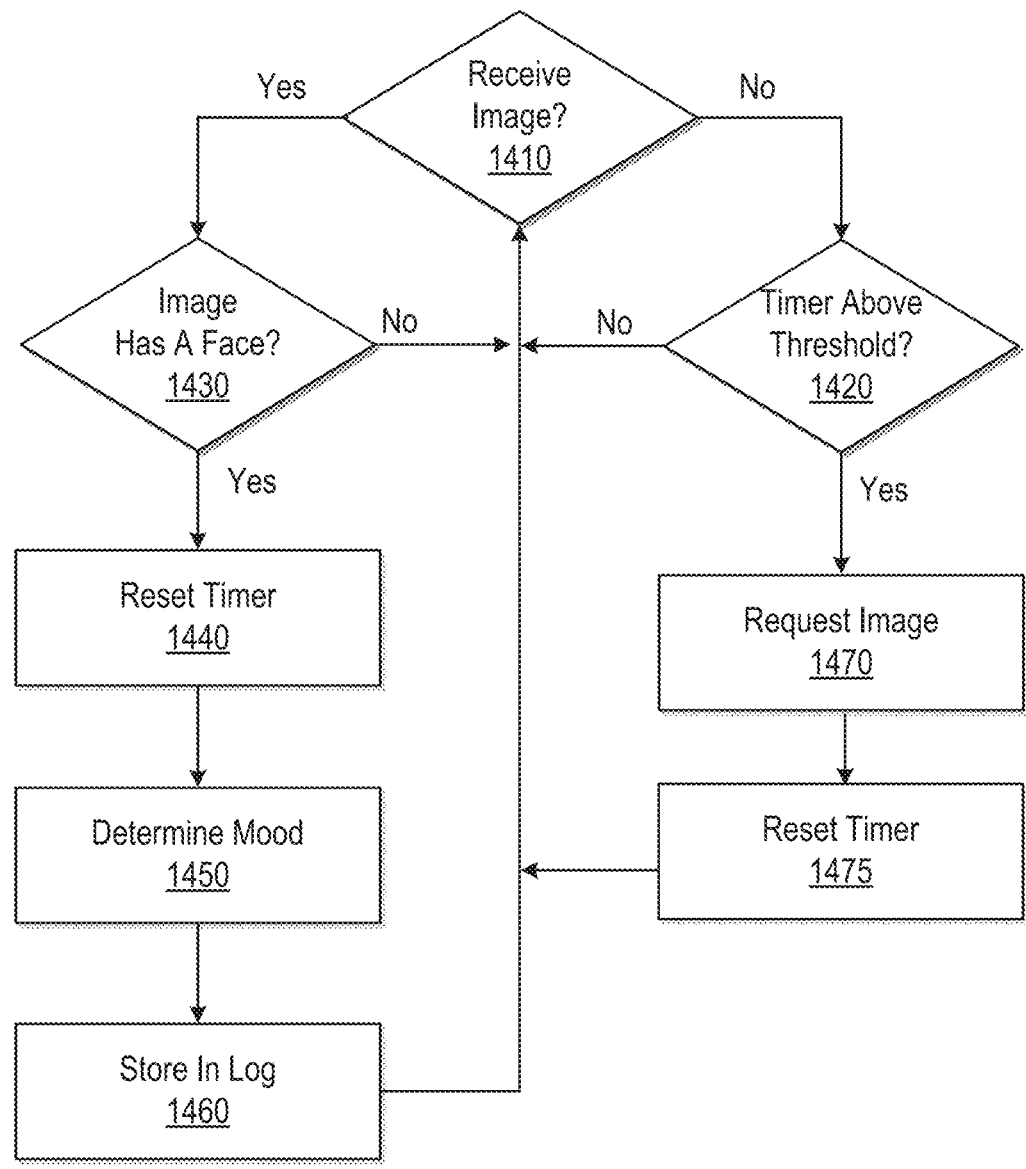
FIG. 14 is a flow diagram illustrating an example method for generating a mood log, according to some example embodiments.

FIG. 14 is a flow diagram illustrating an example method 1400 for generating a mood log, according to some example embodiments. The operations of the method 1400 may be performed by components of the mood log system 160, and are so described below for the purposes of illustration.

In one embodiment, the method 1400 begins and at operation 1410 the image module 220 determines whether an image has been received. In response to the image module 220 not receiving an image at operation 1410, the method 1400 continues at operation 1420 and the image module 220 determines whether a timer is above a threshold period of time. For example, a threshold period of time may be 3 days. Of course, this disclosure is not limited in this regard and any amount of time may be used.

In response to the timer being above the threshold time, the method 1400 continues at operation 1470 and the image module 220 requests an image from the user. The image module 220 may notify the user in any way as one skilled in the art may appreciate. The method 1400 continues at operation 1475 and the image module 220 resets the timer to a time of zero. The method 1400 continues at operation 1410.

In response to, at operation 1410, an image being received, the method continues at operation 1430 and the mood module 220 determines whether the face of the user is included in the image. In response to the user's face not being included in the image, the method 1400 continues at operation 1410.

In response to the image including the user's face, the method 1400 continues at operation 1440 and the image module 220 resets the timer. The method continues at operation 1450 and the mood module 240 determines a mood level of the user based on the image. The method continues at operation 1460 and the log module 260 stores the mood level in a log of mood levels for the user. The method continues at operation 1410.

Figure 15:
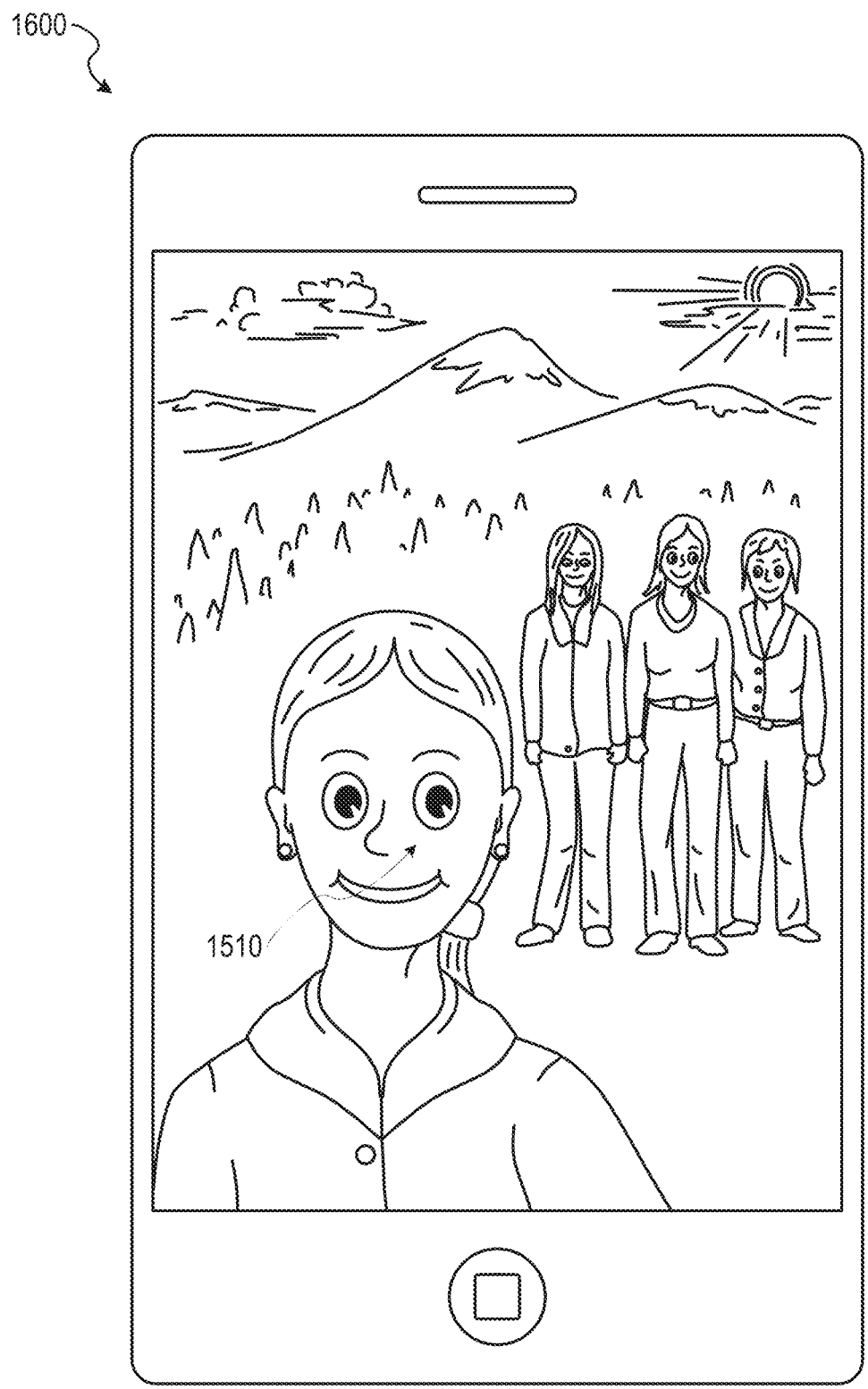
FIG. 15 depicts an example user device (e.g., smart phone) displaying an example user interface, according to some example embodiments.

FIG. 15 depicts an example user device (e.g., smart phone) displaying an example user interface, according to some example embodiments. Although user interfaces described herein depict specific example user interfaces and user interface elements, these are merely non-limiting examples and many other alternate user interfaces. It will be noted that alternate presentations of the displays described herein include additional information, graphics, options, and so forth; other presentations include less information, or provide abridged information for easy use by the user.

In various example embodiments, the user interface is an example of a message composition user interface of a social messaging app executing on a mobile device. In an embodiment, the user interface 1600 includes message content comprising an image (still photos/pictures or video) (e.g., captured by a camera sensor of the user device 1600).

Modules, Components, and Logic

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein. "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein. "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Software Architecture

Figure 16:
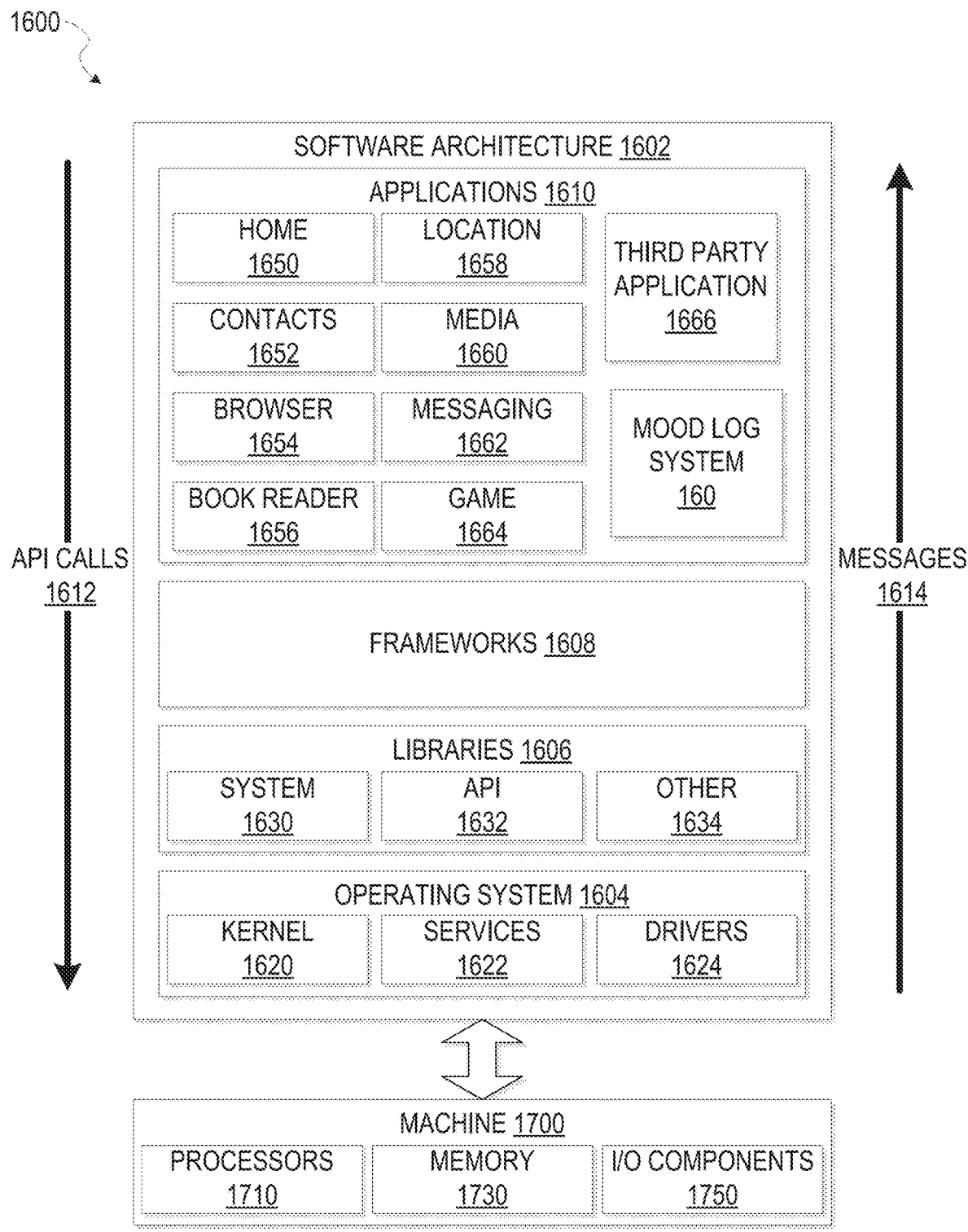
FIG. 16 is a block diagram illustrating an example of a software architecture that may be installed on a machine, according to some example embodiments.

FIG. 16 is a block diagram illustrating an example of a software architecture 1600 that may be installed on a machine, according to some example embodiments. FIG. 16 is merely a non-limiting example of a software architecture, and it will be appreciated that many other architectures can be implemented to facilitate the functionality described herein. In various embodiments, the software 1602 is implemented by hardware such as machine 1700 of FIG. 17 that includes processors 1710, memory 1730, and I/O components 1750. In this example architecture, the software 1602 can be conceptualized as a stack of layers where each layer may provide a particular functionality. For example, the software 1602 includes layers such as an operating system 1604, libraries 1606, frameworks 1608, and applications 1610. Operationally, the applications 1610 invoke application programming interface (API) calls 1612 through the software stack and receive messages 1614 in response to the API calls 1612, consistent with some embodiments. In one example, the modules of the mood detection system 160 operates as an application 1610.

In various implementations, the operating system 1604 manages hardware resources and provides common services. The operating system 1604 includes, for example, a kernel 1620, services 1622, and drivers 1624. The kernel 1620 acts as an abstraction layer between the hardware and the other software layers consistent with some embodiments. For example, the kernel 1620 provides memory management, processor management (e.g., scheduling), component management, networking, and security settings, among other functionality. The services 1622 can provide other common services for the other software layers. The drivers 1624 are responsible for controlling or interfacing with the underlying hardware, according to some embodiments. For instance, the drivers 1624 can include display drivers, camera drivers, BLUETOOTH® drivers, flash memory drivers, serial communication drivers (e.g., Universal Serial Bus (USB) drivers), WI-FI drivers, audio drivers, power management drivers, and so forth.

In some embodiments, the libraries 1606 provide a low-level common infrastructure utilized by the applications 1610. The libraries 1606 can include system libraries 1630 (e.g., C standard library) that can provide functions such as memory allocation functions, string manipulation functions, mathematic functions, and the like. In addition, the libraries 1606 can include API libraries 1632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC). Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1606 can also include a wide variety of other libraries 1634 to provide many other APIs to the applications 1610.

The frameworks 1608 provide a high-level common infrastructure that can be utilized by the applications 1610, according to some embodiments. For example, the frameworks 1608 provide various graphic user interface (GUI) functions, high-level resource management, high-level location services, and so forth. The frameworks 1608 can provide a broad spectrum of other APIs that can be utilized by the applications 1610, some of which may be specific to a particular operating system or platform.

In an example embodiment, the applications 1610 include a home application 1650, a contacts application 1652, a browser application 1654, a book reader application 1656, a location application 1658, a media application 1660, a messaging application 1662, a game application 1664, and a broad assortment of other applications such as a third party application 1666. According to some embodiments, the applications 1610 are programs that execute functions defined in the programs. In one embodiment, the applications 1610 include the mood log system 160. Therefore, the mood log system 160 may be implemented as executable code as with other applications 1610.

Various programming languages can be employed to create one or more of the applications 1610, structured in a variety of manners, such as object-oriented programming languages (e.g., Objective-C, Java, or C++) or procedural programming languages (e.g., C or assembly language). In a specific example, the third party application 1666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application 1666 can invoke the API calls 1612 provided by the operating system 1604 to facilitate functionality described herein.

Example Machine Architecture and Machine-Readable Medium

Figure 17:
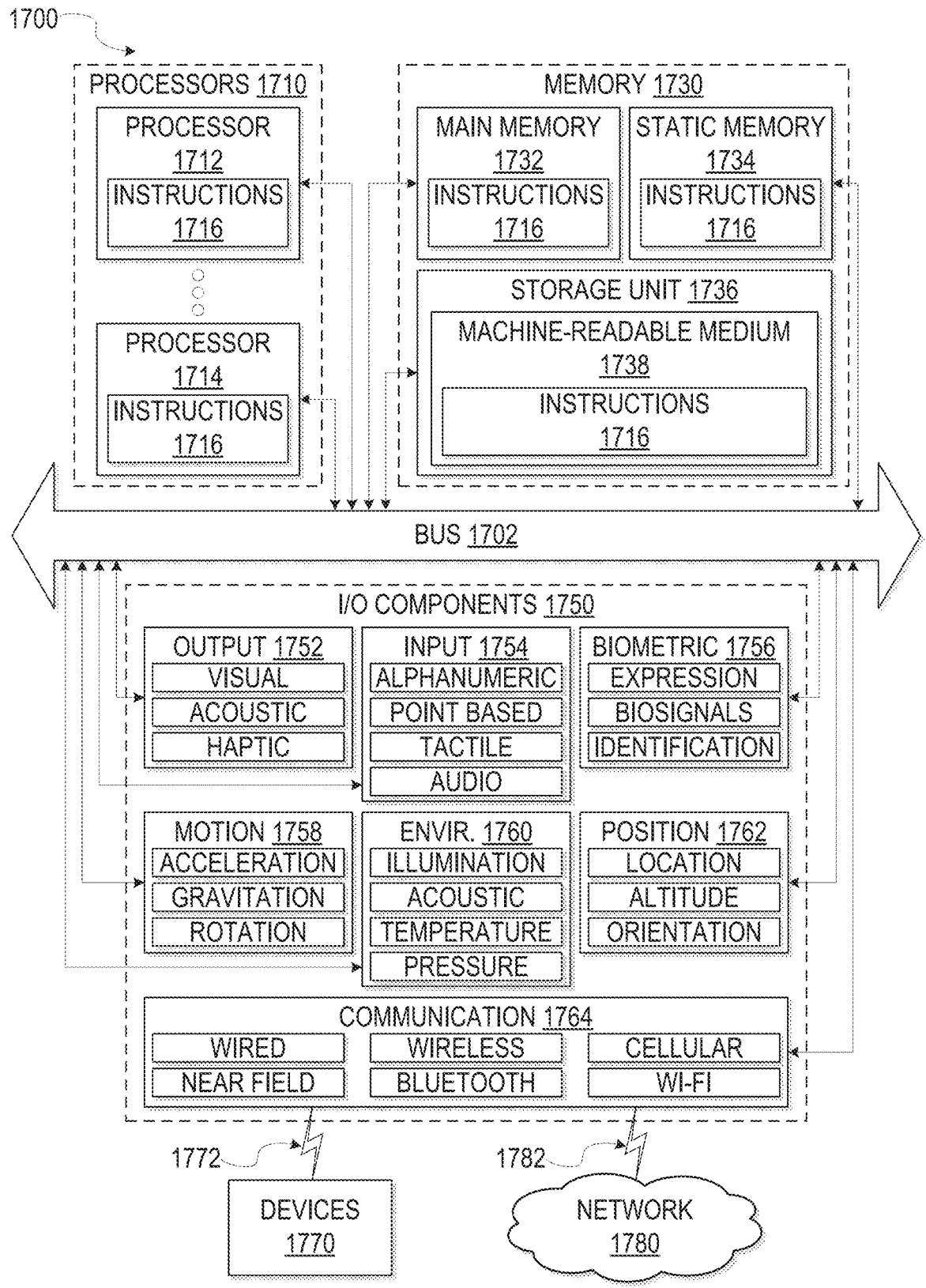
FIG. 17 illustrates a diagrammatic representation of a machine in the form of a computer system within which a set of instructions may be executed for causing the machine to perform any one or more of the methodologies discussed herein, according to an example embodiment.

FIG. 17 illustrates a diagrammatic representation of a machine in the form of a computer system within which a set of instructions may be executed for causing the machine to perform any one or more of the methodologies discussed herein, according to an example embodiment. Specifically. FIG. 17 shows a diagrammatic representation of the machine 1700 in the example form of a computer system, within which instructions 1716 (e.g., software, a program, an application, an applet, an app, or other executable code) for causing the machine 1700 to perform any one or more of the methodologies discussed herein can be executed. In alternative embodiments, the machine 1700 operates as a standalone device or can be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines 1700 that individually or jointly execute the instructions 1716 to perform any one or more of the methodologies discussed herein. In one specific example, the various modules 220,240,260,280 are included in the instructions 1716.

In various embodiments, the machine 1700 comprises processors 1710, memory 1730, and I/O components 1750, which can be configured to communicate with each other via a bus 1702. In an example embodiment, the processors 1710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1712 and a processor 1714 that may execute the instructions 1716. The term "processor" is intended to include multi-core processors that may comprise two or more independent processors (also referred to as "cores") that can execute instructions contemporaneously. Although FIG. 17 shows multiple processors, the machine 1700 may include a single processor with a single core, a single processor with multiple cores (e.g., a multi-core processor), multiple processors with a single core, multiple processors with multiples cores, or any combination thereof.

The memory 1730 comprises a main memory 1732, a static memory 1734, and a storage unit 1736 accessible to the processors 1710 via the bus 1702, according to some embodiments. The storage unit 1736 can include a machine-readable medium 1738 on which are stored the instructions 1716 embodying any one or more of the methodologies or functions described herein. The instructions 1716 can also reside, completely or at least partially, within the main memory 1732, within the static memory 1734, within at least one of the processors 1710 (e.g., within the processor's cache memory), or any suitable combination thereof, during execution thereof by the machine 1700. Accordingly, in various embodiments, the main memory 1732, the static memory 1734, and the processors 1710 are considered machine-readable media 1738.

In certain examples, the image module 220, the mood module 240, and the log module 240 are executable code comprising instructions performed by the processor 1712. In one example, the modules 220-260 are stored in the memory 1730. In another example, the log module 260 stores the mood levels via the storage unit 1736.

As used herein, the term "memory" refers to a machine-readable medium 1738 able to store data temporarily or permanently and may be taken to include, but not be limited to, random-access memory (RAM), read-only memory (ROM), buffer memory, flash memory, and cache memory. While the machine-readable medium 1738 is shown in an example embodiment to be a single medium, the term "machine-readable medium" should be taken to include a single medium or multiple media (e.g., a centralized or distributed database, or associated caches and servers) able to store the instructions 1716. The term "machine-readable medium" shall also be taken to include any medium, or combination of multiple media, that is capable of storing instructions (e.g., instructions 1716) for execution by a machine (e.g., machine 1700), such that the instructions, when executed by one or more processors of the machine 1700 (e.g., processors 1710), cause the machine 1700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1750 include a wide variety of components to receive input, provide output, produce output, transmit information, exchange information, capture measurements, and so on. In general, it will be appreciated that the I/O components 1750 can include many other components that are not shown in FIG. 17. The I/O components 1750 are grouped according to functionality merely for simplifying the following discussion, and the grouping is in no way limiting. In various example embodiments, the I/O components 1750 include output components 1752 and input components 1754. The output components 1752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1754 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In specific examples, the log module 260 outputs the graphical representation of the mood levels via an output device 1752. The image module 220 may receive input from a user, including one or more threshold values, from an input component 1754. In another example, the mood module 240 receives input from a biometric component 1756 as described herein.

In some further example embodiments, the I/O components 1750 include biometric components 1756, motion components 1758, environmental components 1760, or position components 1762, among a wide array of other components. For example, the biometric components 1756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1758 include acceleration sensor components (e.g., accelerometer), gravitation sensor components, rotation sensor components (e.g., gyroscope), and so forth. The environmental components 1760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1750 may include communication components 1764 operable to couple the machine 1700 to a network 1780 or devices 1770 via a coupling 1782 and a coupling 1772, respectively. For example, the communication components 1764 include a network interface component or another suitable device to interface with the network 1780. In further examples, communication components 1764 include wired communication components, wireless communication components, cellular communication components. Near Field Communication (NFC) components, BLUETOOTH® components (e.g., BLUETOOTH® Low Energy), WI-FI components, and other communication components to provide communication via other modalities. The devices 1770 may be another machine or any of a wide variety of peripheral devices (e.g., a peripheral device coupled via a Universal Serial Bus (USB)).

Moreover, in some embodiments, the communication components 1764 detect identifiers or include components operable to detect identifiers. For example, the communication components 1764 include Radio Frequency Identification (RFID) tag reader components. NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417. Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1764, such as location via Internet Protocol (IP) geolocation, location via WI-FI signal triangulation, location via detecting a BLUETOOTH® or NFC beacon signal that may indicate a particular location, and so forth.

Transmission Medium

In various example embodiments, one or more portions of the network 1780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1780 or a portion of the network 1780 may include a wireless or cellular network, and the coupling 1782 may be a Code Division Multiple Access (CDMA) connection, a Global System for Mobile communications (GSM) connection, or another type of cellular or wireless coupling. In this example, the coupling 1782 can implement any of a variety of types of data transfer technology, such as Single Carrier Radio Transmission Technology (1×RTT). Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS). High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1716 are transmitted or received over the network 1780 using a transmission medium via a network interface device (e.g., a network interface component included in the communication components 1764) and utilizing any one of a number of well-known transfer protocols (e.g., Hypertext Transfer Protocol (HTTP)). Similarly, in other example embodiments, the instructions 1716 are transmitted or received using a transmission medium via the coupling 1772 (e.g., a peer-to-peer coupling) to the devices 1770. The term "transmission medium" shall be taken to include any intangible medium that is capable of storing, encoding, or carrying the instructions 1716 for execution by the machine 1700, and includes digital or analog communications signals or other intangible media to facilitate communication of such software.

Furthermore, the machine-readable medium 1738 is non-transitory (in other words, not having any transitory signals) in that it does not embody a propagating signal. However, labeling the machine-readable medium 1738 "non-transitory" should not be construed to mean that the medium is incapable of movement; the medium should be considered as being transportable from one physical location to another. Additionally, since the machine-readable medium 1738 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving, by one or more hardware processors, a video taken by a mobile computing device,
determining that a face of a user is included in the video, and
in response to determining that the video includes the face of the user, determining a mood based on physical movement of the face of by the user in the video, wherein determining the mood comprises:
sampling the video to generate a set of images from the video;
determining a plurality of mood levels each associated with a respective image in the set of images of the video;
adjusting intensities of the plurality of mood levels determined for the set of images of the video based on a threshold number of movements of the face of the user in the video in a period of time;
causing, by a server, display of a visual indicator of the mood levels on the mobile computing device.

2. The method of claim 1, wherein determining the plurality of mood levels further comprises defining points for two or more features of face of the user in each of the images, comparing a distribution of the points to a database of point distributions, and selecting the mood level from a database based at least in part on the distribution of points.

3. The method of claim 1, further comprising associating a mood level with an event experienced by the user and notifying the user that the event is associated with the mood level.

4. The method of claim 1, further comprising:
associating the plurality of mood levels with an interaction between the user and another user, and
determining an aggregate mood level associated with the another user based on the associated mood levels.

5. The method of claim 4, further comprising notifying the user of the aggregate mood level associated with the another user.

6. The method of claim 1, further comprising discarding images from the video that do not include the face of the user system.

7. The method of claim 1, further comprising:
aggregating the plurality of mood levels in a log of emotions; and
accessing the log of emotions to determine emotional levels experienced by the user in different scenarios.

8. The method of claim 1, further comprising:
determining that the threshold number of movements is greater than a specified amount; and
in response to determining that the threshold number of movements is greater than the specified amount, increasing the intensities the plurality of mood levels.

9. The method of claim 8, further comprising:
determining that the threshold number of movements is less than the specified amount; and
in response to determining that the threshold number of movements is less than the specified amount, decreasing the intensities the plurality of mood levels.

10. The method of claim 9, wherein the specified is received from the user.

11. The method of claim 1, further comprising:
tracking the mood of the user as the user interacts with a first person;
generating a graphical representation for the user based on the user interactions with the first person;
determining that the mood of the user is heightened when the user interacts with the first person;
storing in a log an indication that the user prefers to interact with the first person in response to determining that the mood of the user is heightened when the user interacts with the first person;
determining that the mood of the user is lowered when the user interacts with a second person; and
storing in the log an indication that interactions with the second person result in less emotional satisfaction in response to determining that the mood of the user is lowered when the user interacts with the second person.

12. The method of claim 1, further comprising:
detecting an interaction event between the user and another erson; and
capturing the video in response to detecting the interaction.

13. The method of claim 12, wherein the interaction event includes at least one of a text message exchange with the another person, a phone call with the another person, or an email exchange with the another person.

14. The method of claim 1, further comprising:
storing in a database a plurality of classifications associated with respective threshold mood levels;
determining that the mood level of a given one of the images is associated with a first of the threshold mood levels, the given one of the images corresponding to an interaction between the user and a first person;
identifying a first classification of the plurality of classifications associated with the first of the threshold mood levels; and
classifying the first person using the first classification.

15. The method of claim 14, further comprising:
determining that the mood level of a second one of the images is associated with a second of the threshold mood levels, the second one of the images corresponding to an interaction between the user and a second person;
identifying a second classification of the plurality of classifications associated with the second of the threshold mood levels; and
classifying the second person using the second classification.

16. A system comprising:
one or more hardware processors;
a hardware memory comprising instructions that when executed configure the one or more hardware processors to perform operations comprising:

receiving a video taken by a mobile computing device,
determining that a face of a user is included in the video, and
in response to determining that the video includes the face of the user, determining a mood based on physical movement of the face of by the user in the video, wherein determining the mood comprises:
sampling the video to generate a set of images from the video;
determining a plurality of mood levels each associated with a respective image in the set of images of the video;
adjusting intensities of the plurality of mood levels determined for the set of images of the video based on a threshold number of movements of the face of the user in the video in a period of time; and
causing, by a server, display of a visual indicator of the mood levels on the mobile computing device.

17. A non-transitory computer readable storage medium comprising instructions that when executed configure hardware processing circuitry to perform operations comprising:
receiving a video taken by a mobile computing device,
determining that a face of a user is included in the video, and
in response to determining that the video includes the face of the user, determining a mood based on physical movement of the face of by the user in the video, wherein determining the mood comprises:
sampling the video to generate a set of images from the video;
determining a plurality of mood levels each associated with a respective image in the set of images of the video;
adjusting intensities of the plurality of mood levels determined for the set of images of the video based on a threshold number of movements of the face of the user in the video in a period of time; and
causing, by a server, display of a visual indicator of the mood levels on the mobile computing device.

18. The non-transitory computer readable storage medium of claim 17, the operations further comprising associating a mood level with an event experienced by the user and notifying the user that the event is associated with the mood level.

19. The non-transitory computer readable storage medium of claim 17, the operations further comprising:
associating a mood level with an interaction between the user and another user, and
determining an aggregate mood level associated with the another user based on the associated mood levels.

* * * * *

UNITED STATES PATENT AND TRADEMARK OFFICE
CERTIFICATE OF CORRECTION

PATENT NO. : 10,936,858 B1  
APPLICATION NO. : 16/167175  
DATED : March 2, 2021  
INVENTOR(S) : Sheldon Chang Page 1 of 1

It is certified that error appears in the above-identified patent and that said Letters Patent is hereby corrected as shown below:

In the Claims

Column 23, Lines 61-62, Claim 6, delete "user system." and insert --user.-- therefor Column 24, Line 34, Claim 12, delete "erson;" and insert --person;-- therefor Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*